(12) United States Patent
Saffie-Siebert et al.

(10) Patent No.: US 12,472,150 B2
(45) Date of Patent: Nov. 18, 2025

(54) DELIVERY SYSTEM COMPRISING SILICON-CONTAINING MATERIAL

(71) Applicant: SISAF LIMITED, Guildford (GB)

(72) Inventors: Roghieh Suzanne Saffie-Siebert, Guildford (GB); Nasrollah Torabi-Pour, Guildford (GB); Mukhtar Ahmed, Guildford (GB)

(73) Assignee: SISAF LIMITED, Guildford (GB)

( * ) Notice: Subject to any disclaimer, the term of this patent is extended or adjusted under 35 U.S.C. 154(b) by 1085 days.

(21) Appl. No.: 17/598,467

(22) PCT Filed: Mar. 30, 2020

(86) PCT No.: PCT/GB2020/050849
§ 371 (c)(1),
(2) Date: Sep. 27, 2021

(87) PCT Pub. No.: WO2020/193995
PCT Pub. Date: Oct. 1, 2020

(65) Prior Publication Data
US 2022/0183989 A1    Jun. 16, 2022

(30) Foreign Application Priority Data
Mar. 28, 2019 (GB) ................... 1904336

(51) Int. Cl.
| | | |
|---|---|---|
| A61K 31/713 | (2006.01) | |
| A61K 9/00 | (2006.01) | |
| A61K 9/51 | (2006.01) | |
| A61K 48/00 | (2006.01) | |

(52) U.S. Cl.
CPC .......... *A61K 9/5115* (2013.01); *A61K 9/0048* (2013.01); *A61K 9/5123* (2013.01); *A61K 31/713* (2013.01); *A61K 48/00* (2013.01)

(58) Field of Classification Search
CPC .. A61K 9/5115; A61K 9/0048; A61K 9/5123; A61K 31/713; A61K 48/00
See application file for complete search history.

(56) References Cited

U.S. PATENT DOCUMENTS

| | | |
|---|---|---|
| 5,922,360 A | 7/1999 | Bronder |
| 6,670,335 B2 | 12/2003 | Singh et al. |
| 8,992,984 B1 | 3/2015 | Brinker et al. |
| 9,603,801 B2 | 3/2017 | Barnett |
| 2007/0259013 A1 | 11/2007 | Avram et al. |
| 2009/0053268 A1 | 2/2009 | Depablo et al. |
| 2009/0208556 A1 | 8/2009 | Freeman |
| 2012/0128786 A1 | 5/2012 | Saffie-Siebert |
| 2016/0106091 A1 | 4/2016 | Meunier et al. |
| 2017/0007531 A1 | 1/2017 | Bastos et al. |
| 2018/0296696 A1 | 10/2018 | Ruoslahti |
| 2018/0344641 A1 | 12/2018 | Brinker et al. |

FOREIGN PATENT DOCUMENTS

| | | |
|---|---|---|
| AU | 774668 B2 | 4/2001 |
| CA | 3070107 | 7/2017 |
| CN | 104023711 A | 9/2014 |
| CN | 104127886 | 11/2014 |
| CN | 105434205 A | 3/2016 |
| CN | 106 177 982 A | 12/2016 |
| CN | 106265432 A | 1/2017 |
| CN | 107 616 952 A | 1/2018 |
| CN | 107 625 966 A | 1/2018 |
| CN | 107998264 A | 5/2018 |
| CN | 108552223 A | 9/2018 |
| CN | 101296625 A | 10/2018 |
| CN | 106806343 A | 6/2019 |
| EP | 0 272 091 A2 | 6/1988 |
| EP | 2 030 632 A1 | 3/2009 |
| EP | 2459156 | 11/2020 |
| JP | 2006016390 A | 1/2006 |
| JP | 2011032194 A | 2/2011 |
| WO | WO9749375 A1 | 12/1997 |
| WO | WO 02/067998 A1 | 9/2002 |
| WO | WO 2004/016551 A1 | 2/2004 |
| WO | WO 2006/050221 A2 | 5/2006 |
| WO | WO 2007/012847 A1 | 2/2007 |
| WO | WO2009005963 A2 | 1/2009 |
| WO | WO 2010/038064 | 4/2010 |
| WO | WO2011/001456 | 1/2011 |
| WO | WO 2011/012867 A1 | 2/2011 |
| WO | WO 2013/056132 | 4/2013 |
| WO | WO 2014/165608 | 10/2014 |
| WO | WO 2017/008059 A1 | 1/2017 |

(Continued)

OTHER PUBLICATIONS

Office Action issued in counterpart Chinese Application No. 202080023934.2 mailed Apr. 21, 2023, English Language translation thereof.
Ruijin Zhao, et al. Beijing: Military Medical Science Press, "Oncology Health Education," Aug. 31, 2010, pp. 530-531.
Zhihua Wu, et al., Guangzhou: Guangdong Science and Technology Press, "Dermatologic Venereology: Textbook Edition," Jun. 30, 2013, p. 284.
Jinglong Cai, et al., Hangzhou: Zhejiang Science and Technology Publishing House, "Scar Plastic and Aesthetic Surgery" Mar. 31, 2015, p. 786.
Office Action issued in counterpart Indian Application No. 202147045961 mailed Apr. 6, 2023.
Office Action issued in counterpart Chinese Application No. 202080025724.5 mailed Mar. 30, 2023, English Language translation thereof.

(Continued)

*Primary Examiner* — Zohreh A Fay
(74) *Attorney, Agent, or Firm* — Marian E. Fundytus; Amster Rothstein & Ebenstein LLP

(57) ABSTRACT

A method for promoting the controlled binding and release of a bioactive or pharmaceutical agent from a composition comprising silicon nanoparticles, wherein the silicon nanoparticles comprise at least 50% by weight silicon, the method comprising treating the surface of the silicon nanoparticles with at least one lipid, and treating the surface of the silicon nanoparticles with at least one amino acid, wherein the ratio of lipid to silicon is from 1:1 to 15:1. Also related compositions and methods.

23 Claims, 21 Drawing Sheets

(56) References Cited

FOREIGN PATENT DOCUMENTS

| | | |
|---|---|---|
| WO | WO 2017/013250 | 1/2017 |
| WO | WO 2017/041032 | 3/2017 |
| WO | WO 2017/120537 | 7/2017 |
| WO | WO 2017/120537 A1 | 7/2017 |
| WO | WO 2017/181115 A1 | 10/2017 |
| WO | WO2018029247 A1 | 2/2018 |
| WO | WO 2018/134222 | 7/2018 |
| WO | WO 2019/028387 | 2/2019 |

OTHER PUBLICATIONS

Roggers R.A. et al., Molecular Pharmaceutics, 2012, vol. 9 "Chemically Reducible Lipid Bilayer Coated Mesoporous Silica Nanoparticles Demonstrating Controlled Release and HeLa and Normal Mouse Liver Cell Biocompatibility and Cellular Internalization", pp. 2770-2777.
Liu D et al., Advanced functional materials, 2013, vol. 23 No 15, "Nanostructured Porous Silicon-Solid Nanocomposite: Towards Enhanced Cytocompatibility and Stability, Reduced Cellular Association, and Prolonged Drug Release", pp. 1893-1902.
Examination report issued in GB Application No. GB1904336.3, mailed Aug. 1, 2019.
Examination report issued in GB Application No. GB1904334.8, mailed Aug. 12, 2019.
Examination report issued in GB Application No. GB1904337.1, mailed Aug. 1, 2019.
Examination report issued in GB Application No. GB1904338.9, mailed Aug. 8, 2019.
Extended European Search Report issued in Application No. 19165904.4, mailed Oct. 14, 2019.
Office Action issued in AU Application No. 2020249806 mailed Nov. 5, 2024.
Office Action issued in counterpart Chinese Application No. 202080025659.6 mailed Apr. 17, 2023, English Language translation thereof.
Elizabeth A. Worrell, Aflaq Hamid, Karishma T. Mody, Neena Mitter and Hanu R. Pappu, "Nanotechnology for Plant Disease Management", Agronomy, 2018, 8, 285, 1-24. (Year: 2018).
Pan et al., Colloids and Surfaces B: Biointerfaces 159 (2017) 375-385.
Jasmina Kurepa, Timothy E. Shull and Jan A. Smalle, "Quercetin feeding protects plants against oxidative stress", F1000Research, 2016, 5:2430, 1-10. (Year: 2016).
Cheang, Tuck-yun, et al. "Promising plasmid DNA vector based on APTES-modified silicon nanoparticles." International journal of nanomedicine (2012): 1061-1067.).
Office Action issued in CN Application No. 202080025659.6 mailed Jan. 10, 2025, with English language translation thereof.
International Search Report issued in International Application No. PCT/GB2020/050850, mailed Jul. 15, 2020.
Written Opinion of the International Searching Authority issued in International Application No. PCT/GB2020/050850, mailed Jul. 15, 2020.
Saffie-Siebert R et al., Drug Discovery World 2005; 6: 71-6.
Saffie-Siebert, R et al., Pharmaceutical Technology Europe, 17(4), 21-28 (2005).
Luo, D., Saltzman, W. M., Gene Therapy (2006) 13, 585-586.
Ahola, M., Kortesuo, P., Kangasniemi, I., Kiesvaara, J., Yli-Urpo, A., Int. J. Pharm. 195 (2000) 219 227.
Ahola. M., Säilynoja, E.S., Raitavuo, M.H., Vaahtio, M.H., Salonen, J.I., Yli-Urpo, A.U.O., Biomat. (2001), 15, 2163-2170.
Lu, J., Liong, M., Zink, J., Tamanoi, F, Small. 2007, 3: 1341-1346.
Studies of the kinetics of the precipitation of uniform silica particles through the hydrolysis and condensation of silicon alkoxides, Journal of Colloid and Interface Science, vol. 142, Issue 1, Mar. 1, 1991, pp. 1-18 G.H Bogush and C.F Zukoski IV.
International Search Report issued in International Application No. PCT/GB2020/050851, mailed May 25, 2020.
Written Opinion of the International Searching Authority issued in International Application No. PCT/GB2020/050851, mailed May 25, 2020.
Lundstrom et al., Medicines, 2017, 4, 12.
Rameová et al., Anal. Bioanal. Chem., 2016, 402, 975.
International Search Report issued in International Application No. PCT/GB2020/050854, mailed Jul. 7, 2020.
Written Opinion of the International Searching Authority issued in International Application No. PCT/GB2020/050854, mailed Jul. 7, 2020.
Communication Pursuant to Article 94 (3) EPC issued in counterpart application No. 20 718 723.8, mailed Jun. 29, 2022.
International Search Report issued in International Application No. PCT/GB2020/050853, mailed Jul. 10, 2020.
Written Opinion of the International Searching Authority issued in International Application No. PCT/GB2020/050853, mailed Jul. 10, 2020.
Xie W, Hu L. Mesoporous SBA-15 Silica-supported Diisopropylguanidine: an Efficient Solid Catalyst for Interesterification of Soybean Oil with Methyl Octanoate or Methyl Decanoate. J Oleo Sci. Oct. 1, 2016;65(10):803-813. Epub Sep. 15, 2016.
U.S. Appl. No. 17/598,595, filed Sep. 27, 2021, published as 2022-0151944 A1.
U.S. Appl. No. 17/598,536, filed Sep. 27, 2021, published as US 2022-0174952-A1.
U.S. Appl. No. 17/598,703, filed Sep. 27, 2021.
U.S. Appl. No. 17/599,020, filed Sep. 27, 2021, published as US 2022-0184038-A1.
Communication Pursuant to Article 94 (3) EPC issued in counterpart application No. 20 718 722.0, mailed Aug. 8, 2022.
Communication Pursuant to Article 94 (3) EPC issued in counterpart application No. 20 718 724.6, mailed Aug. 8, 2022.
Communication Pursuant to Article 94 (3) EPC issued in counterpart application No. 20 718 725.3, mailed Jun. 29, 2022.
Communication Pursuant to Article 94 (3) EPC issued in counterpart application No. 20 716 902.0, mailed Jul. 5, 2022.
Office Action issued in JP Application No. 2021-557824 mailed Jan. 30, 2024, English Language translation thereof.
Office Action issued in counterpart Chinese Application No. 202080025658.1 mailed Jun. 30, 2023, English Language translation thereof.
Examination Report issued in counterpart European Application No. 20 718 722.0 mailed Jul. 7, 2023.
Office Action issued in Chinese Application No. 202080025659.6 mailed Nov. 27, 2023, English Language translation thereof.
Office Action issued in Chinese Application No. 202080024934.2 mailed Oct. 25, 2023, English Language translation thereof.
Pluskota A, "In Caenorhabditis elegans Nanoparticle-Bio-Interactions Become Transparent: Silica-Nanoparticles Induce Reproductive Senescenc." PLoS One | www.plosone.org; Aug. 2009| vol. 4 | Issue 8 | e6622.
Model Biotoxicology Based on Summaries and Reflections on Hidradenitis elegans Research, Dayong Wang, et al., Nanjing: Southeast University Press, pp. 153, publication date: Jan. 31, 2013).
Office Action issued in Japanese Application No. JP 2021-557827 mailed Nov. 21, 2023, English Language translation thereof.
International Search Report issued in International Application No. PCT/GB2020/050849, mailed May 20, 2020.
Written Opinion of the International Searching Authority issued in International Application No. PCT/GB2020/050849, mailed May 20, 2020.
Juewen Liu et al: "Porous Nanoparticle Supported Lipid Bilayers (Protocells) as Delivery Vehicles", Journal of the American Chemical Society, vol. 131, No. 4, Feb. 4, 2009, pp. 1354-1355, XP055029872, ISSN: 0002-7863, DOI: 10.1021.
Yanan Liu, et al., "Effect of mesoporous silica nanoparticles on drug loading properties and drug release of flavonoids." Proprietary Chinese Medicines, Mar. 31, 2015, vol. 38, Issue 3, pp. 528-532.
V.V. Cotea et al., Mesoporous silica SBA-15, a new adsorbent for bioactive polyphenols from red wine Oct. 18, 2011, Analytica Chimica Acta, vol. 732, V.V., pp. 1-26.

(56) References Cited

OTHER PUBLICATIONS

Office Action issued in counterpart Chinese Application No. 202080025658.1 mailed Nov. 2, 2022 with English Language translation thereof.
Office Action issued in counterpart Chinese Application No. 202080025724.5 mailed Nov. 2, 2022 with English Language translation thereof.
Examination Report issued in counterpart European Application No. 20 718 722.0 mailed Mar. 21, 2024 indicating all claims are allowable.

| | DAPI | FAM | DAPI+FAM |
|---|---|---|---|
| F11 |  |  |  |
| F12 |  |  |  |
| F14 |  |  |  |
| F15 |  |  |  |
| F17 |  |  |  |
| F18 |  |  |  |

DELIVERY SYSTEM COMPRISING SILICON-CONTAINING MATERIAL

CROSS REFERENCE TO RELATED APPLICATIONS

The present application is a § 371 National Phase application based on PCT/GB2020/050849 filed Mar. 30, 2020, which claims the benefit of GB Application No. 1904336.3, filed Mar. 28, 2019, the subject matter of each of which is incorporated by reference in their entirety.

FIELD OF THE INVENTION

The present invention concerns delivering agents for cosmetics, skin care and pharmaceuticals. More particularly, but not exclusively, this invention concerns the use of silicon nanoparticles as controlled release agents. The invention also concerns related compositions.

BACKGROUND OF THE INVENTION

Improved methods for achieving effective delivery of active ingredients to the desired target site remain a goal of the cosmetics, skin care and pharmaceutical industries.

A number of ways of delivering of pharmaceutically active ingredients in a controlled or slow-release manner have been developed. However, little attention has previously been paid to the fate of the carrier material once it has performed its function of delivering and releasing the active ingredient. This invention seeks to provide a new type of delivery system for delivering of pharmaceutically active ingredients in a controlled and/or slow-release manner but also one in which a silicon-based carrier material is converted to a biologically beneficial substance following administration.

Topical delivery of active agents presents particular problems due to issues of poor stability of most biological compounds, and the inability of active agents to penetrate into the deeper skin layers due to their molecular size. The delivery of active agents is also faced with issues of hydrophobicity, and poor biocompatibility of topical formulations, which can result in health concerns in the patient.

To enable a wider range of active ingredients to be delivered topically, considerable research has been focused on development of strategies for temporarily disrupting the stratum corneum barrier in a controllable fashion, so that drugs can permeate in sufficient and predictable quantities, thus attaining therapeutic levels. While some techniques such as iontophoresis and ultrasound have been explored as skin absorption enhancers, most effort has centred on identifying non-toxic chemical penetration enhancers that could reversibly interact with the stratum corneum in order to allow greater amounts of drug to permeate the skin. Early attempts to disrupt the barrier used simple solvents or solvent mixtures, surface-active agents and fatty acids. These materials, although capable of enhancing the penetration of molecules across the skin, are often associated with undesirable side effects such as eliciting an irritation or inflammatory response.

The use of delivery systems has also been investigated. Commonly used delivery systems include relatively viscous fluids such as lotions, creams and gels which can be rubbed into the skin, providing immediate contact with the target region. These vehicles are successfully used for both cosmetic and pharmaceutical compounds. Generally however, such vehicles are unsuitable for the delivery of active compounds over long periods of time because of relatively short residency times on the skin.

In order to create controlled release topical delivery system, other vehicles have been used. Particularly commonly used topical delivery systems utilise lipid-based carriers, such as liposomes. However, these carrier systems have a number of drawbacks such as an unstable central core and a limited loading capacity for hydrophobic compounds. Such carriers are also unsuitable for the delivery of substances that are too large or disruptive for phospholipid vesicles of the skin cells. Liposomes can also be expensive to produce and have a short shelf life, which in some applications requires them to be prepared immediately prior to use. There also remains a continuing need for improved delivery systems for topically applied active agents that can stabilize labile active agents such as botanical extracts, desquamating enzymes, RNA and the like, especially hydrophilic active agents and deliver such agents to the skin or other body surfaces in active form, while being suitable for formulation into vehicles.

Silicon

Silicon is an essential trace element for plants and animals. Silicon has a structural role as a constituent of the protein-glycosaminoglycanes complexes found in the connective tissues matrix of mammals, as well as a metabolic role in growth and osteogenesis (silicon favours the process of mineralisation of the bone). Thus, silicon is essential for the normal development of bones and connective tissue. Silicon is also known to play an important role in skin health, acting as a collagen and elastin promoter and being involved in antioxidative processes in the body. It is implicated in the production of glycosaminoglycans and silicon-dependant enzymes increase the benefits of natural tissue building processes.

For medical applications, silicon can be produced as micro- or nanoparticles, which facilitates its administration via a variety of routes such as topical application, oral intake, injection or implant. Biodegradable silicon-based particles have also been used for drug targeting.

Silicon as Part of a Delivery System

Elemental silicon (Si) dissolves in an aqueous environment to form silicic acids, which represent a family of oxoacid compounds of the elements O, H, and Si, with the general formula $[SiO_x(OH)_{4-2x}]_n$.

The first reaction of this process results in the formation orthosilicic acid:

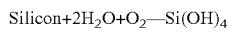

Orthosilicic acid (OSA), also called monosilicic acid, is the simplest soluble form of silica. OSA is a weakly acidic molecule having a $Pk_{a1}$ of 9.8 and stable in water at room temperature, when the concentration of OSA remains below the solubility limit of the amorphous phase (below 2 mM). OSA can dimerize to form $[(HO)_3Si-O-Si(OH)_3]$, which is often present in solutions of OSA even at silicon concentration levels much lower than 2 mM.

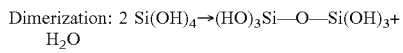

At concentrations above 2 mM, OSA will undergo significant condensation reactions to reduce the concentration of OSA in solution. The condensation reaction of OSA form small oligomers, ranging from linear or monocyclic trimers and tetramers to prismatic octamers and decamers.

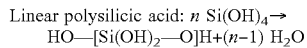
Linear polysilicic acid: $n\ Si(OH)_4 \rightarrow$
$HO-[Si(OH)_2-O]H+(n-1)\ H_2O$

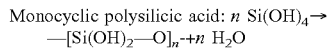
Monocyclic polysilicic acid: $n\ Si(OH)_4 \rightarrow$
$-[Si(OH)_2-O]_n-+n\ H_2O$

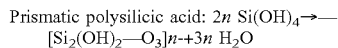
Prismatic polysilicic acid: $2n\ Si(OH)_4 \rightarrow -$
$[Si_2(OH)_2-O_3]n-+3n\ H_2O$ At concentrations greater than 2 mM, the small oligomers serve as nuclei for the formation of small colloidal species that eventually agglomerate to form a gel or aggregate of an amorphous "polysilicic acid" (polySA) precipitate. Silica [$SiO_2$] represents the end point of complete polycondensation of OSA, which reduces its solubility and hence bioavailability, biodegradability, and safety.

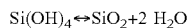
$Si(OH)_4 \leftrightarrow SiO_2+2\ H_2O$

The formation of silica is a reversible process, and thus the reverse reaction from silica to OSA is theoretically possible. However, it is thermodynamically unfavourable under physiological conditions, as the reaction requires highly basic conditions (pH values above 13) and high temperatures.

The reactions of OSA polymerisation are catalysed in acidic and basic conditions, the mechanisms of which are set out below.

Mechanism of Basic Catalysis

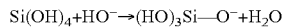
$Si(OH)_4+HO^- \rightarrow (HO)_3Si-O^-+H_2O$

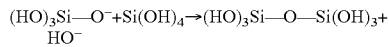
$(HO)_3Si-O^-+Si(OH)_4 \rightarrow (HO)_3Si-O-Si(OH)_3+ HO^-$

Mechanism of Acidic Catalysis

$Si(OH)_4+H_3O+ \rightarrow (HO)_3Si-OH_2^++H_2O$

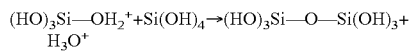
$(HO)_3Si-OH_2^++Si(OH)_4 \rightarrow (HO)_3Si-O-Si(OH)_3+ H_3O^+$

Dimerization of OSA occurs via a condensation reaction between a silicic acid molecule and a protonated or deprotonated from of the silicic acid in solution. The rate of condensation has a minimum at pH≈3, whereas the rate increases at a pH values higher or lower than ≈3. The rate of dimerization is two orders of magnitude faster at a pH of 6 than at pH 4. When the pHE≡$K_{a1}$ of OSA (=9.8) the rate of polymerisation reaches a maximum as the concentrations of the neutral OSA species and the deprotonated form of OSA, are the same in solution allowing for more dimerization events to occur.

The overall solubility of silicon species in water is affected by the pH of the solution, OSA and its oligomers dissociate to various soluble silicates in alkaline solutions, in particular at pH>8. Silicic-acid oligomers are stronger acids than OSA and therefore preferentially dissociate over the OSA. The higher acidity of OSA oligomers and their propensity to dissociate offsets the decreased solubility of the silicon-containing species due to the formation of larger oligomers/polymers of OSA. At pH>9, the extensive formation of soluble polySAs accounts for the increased solubility of silicic acids with increasing pH, due to the increased rate of dissociation of the larger molecules back to OSA. Indeed, the silicate solubility drops to a minimum at a pH of between 7 and 7.5.

Thus, the prerequisites for silicon based formulations for application as a delivery system for pharmaceutical and bioactive agents, are (a) the aqueous solubility of the silicon-containing material and (b) its subsequent reactivity towards biomolecules.

Silicon hydrosolubility depends on the ratio of free silanol (Si—OH) functional groups to silicon backbone. Increasing silicate complexity implies a reduced ratio of silanol groups to silicon, resulting in large macromolecules of poor solubility and reactivity compared to smaller analogues. Thus, the efficacy of such formulations is subject to the ability of silicon to degrade to form OSA, the most biologically active and hence beneficial type of silicic acid. The type of silicic acid produced by a formulation is largely determined by the resultant total concentration of those compounds in, and the pH of the media in which the dissolution occurs. So, to ensure controlled release of OSA in vivo, the silicic acid concentration must be tightly controlled.

When generated from silicon-based formulations, OSA is the only significant species in solution allowing for its gradual and slow release, without locally reaching the threshold concentration (2 mM) for significant OSA condensation into digomers and polymers. At higher concentrations, OSA polymerisation can be ameliorated, such as by additives, or methods of formulation, or chemical or physical modification of the silicon material.

pH-related stability of OSA could be improved by the addition of a biocompatible buffering system (e.g., phosphate, citrate, ascorbate, etc.) so as to keep the local aqueous environment at mildly acidic pH values (i.e. 5-6). Nonetheless, in vivo pH is physiologically regulated and should not be altered.

As a more viable alternative, the adjustment of dissolution rates through particle size and surface chemistry can be tailored prior to in vivo use. To slow down the dissolution of silicon particles, provision of an oxide layer of a suitable thickness can be used to produce a lag in the dissolution profile. The lag results from the time required for the oxide layer to dissolve. The thickness of the oxide layer determines the length of the lag period before the silicon core becomes accessible to water.

Manipulation of the silicon surface requires careful consideration. This is because the binding of a drug molecule to the silicon surface is highly dependent on the surface energy. Hydroxylation of the surface will reduce the surface contact angle, favouring the binding of polar molecules. Alternatively, growth of a surface oxide will increase the surface contact angle, favouring the binding of hydrophobic molecules. Consequently, a combined strategy of size and surface chemistry should be taken into account to obtain control over the level of drug loading and dissolution rate.

Although several studies have considered the potential use of microparticles of silicon-based materials as delivery vehicle for beneficial compounds, the production of high and controlled levels of the products of silicon degradation—especially the bioactive form OSA—following the breakdown of such carrier systems remains difficult to achieve. Previously proposed silicon-based drug delivery systems do not produce and release OSA in a controlled manner and the extent to which the silicic acid remains in the form of OSA has not previously been determined for those formulations. Since many formulations decompose rapidly producing high OSA concentrations, this can lead to polysilicic acid formation.

While silicate and silicon-based formulations have been used as a carrier system for several applications, polymerisation is still a major safety issue. Previously disclosed delivery systems using all forms of silicon, whether porous, microsilica, nanosilica or silicon dioxide particles allegedly undergo dissolution with degradation of the particles to form silicic acid. However, a major problem with known silicon-based delivery systems is that the production and release of OSA is not controlled, thus resulting in OSA polymerisation. The particle size distribution of precipitated silicon is not homogenous and the silicate structure consists of aggregates and agglomerates. Primary particles of silicon, or silicates, couple to each other by hydrogen bonding, forming primary agglomerates which, at a further stage, bind to form spatial structures of the secondary aggregates. This lack of homogeneity of unmodified silicon and the particle size growth can be a significant safety issue if the particles are still in the body in the form of silicate particles or polysilicic acid during the release of the active compounds.

An alternative is the use of stabilised OSA to ensure degradation of the silicon to OSA in vivo. Skincare, cosmetic, pharmaceutical, and cosmeceutical compositions comprising stabilised OSA are well known in the Art, yet they are not suitable for use as drug delivery systems. Therefore, there is still the need for a silicon-based delivery system in which the silicon-containing carrier material reliably degrades to OSA and in which polymerisation of the OSA can be prevented.

Silicon and its derivatives have also been used in drug discovery as drug or bioactive carriers. However those carriers are unable to control the release of the loaded drug without further modification. This is attributed to the fact that those solid materials contain an open pore matrix which, without coating, encounters issues of dose dumping and premature release of the actives.

Australian patent AU 774668 B2 describes a complex containing biologically assimilable orthosilicic acid in a solid form that is stabilised by complexation to a polypeptide. Such complexes are prepared by hydrolysing a precursor of hydrosilicic acid, such as tetraalkoxysilane, in the presence of an aqueous solution of the polypeptide and then evaporating the water to form a sold complex. Suitable polypeptide stabilizers described in AU 774668 B2, which are capable of stabilising orthosilicic acid, include protein hydrolysates, collagen hydrosylates. Although such complexes are capable of delivering OSA in a biologically assimilable form that is stable at neutral and physiological pH levels, it does not provide a system that is capable of delivering other beneficial compounds, such as therapeutically active agents.

U.S. Pat. No. 5,922,360 describes stabilized forms of OSA and biological preparations comprising stabilised OSA. In particular, U.S. Pat. No. 5,922,360 describes stabilization using a stabilizing agent containing a nitrogen atom with a free electron pair which forms a complex with the silanol groups of the OSA. Suitable stabilizing agents described are quaternary ammonium compounds, for instance tetra-alkyl compounds, wherein each alkyl group contains for instance 1-5 carbon atoms, in particular methyl and ethyl groups, and trialkylhydroxyalkyl compounds, wherein the hydroxy group is preferably methanol or ethanol. Choline, for example in the form of choline hydrochloride, is described as particularly suitable and also an amino acid, such as proline and serine which enhances uptake in the stomach and gives additional stability. The stabilised OSA is prepared by hydrolysing a silicon-containing compounds in water in the presence of the stabilising agent so that OSA complexes with the stabilising agent upon production. International patent application WO 2004/016551 A1 similarly discloses a method for preparing a silicic acid containing extrudate in which a silicon compound is hydrolysed to OSA in the presence of a stabilising agent selected from a quaternary ammonium compound, an amino acid or an amino acid source.

The present inventors have developed a method for promoting the controlled release of OSA on degradation of a composition comprising silicon-containing nanoparticles, see WO 2011/012867 A. That method was proven to be successful at stabilising the degradation of silicon to the bioavailable OSA in vivo. The present inventors have also developed a method for promoting the controlled release of both OSA and a pharmaceutical or bioactive agent, on degradation of a composition comprising silicon-containing nanoparticles, see EP 2459156.

Whilst the work outlined in WO 2011/012867 and EP 2459156 provides for the use of lipids to control silica particle degradation and the control of OSA concentration, the present invention is based on the discovery that treating silicon particles with lipids provided at certain levels in combination with one or more amino acids, results in particles with a much-improved ability to bind compounds such as pharmaceutical or bioactive agents. The combination of efficient binding of active agents and their consequential release as the silicon-containing particle is hydrolysed at a controlled rate can be achieved by carefully selecting the lipid used, and optionally other compounds for treating the silicon particles.

SUMMARY OF THE INVENTION

According to a first aspect of the invention, there is provided a method for controlling the binding and release of an active pharmaceutical or cosmetic agent from a composition comprising silicon nanoparticles, wherein the silicon nanoparticles comprise at least 50% by weight silicon, the method comprising treating the surface of the silicon nanoparticles with at least one lipid and at least one amino acid, wherein the ratio of lipid to silicon is 1:1 to 15:1.

Advantageously, by treating the surface of a silicon nanoparticle with a lipid, the rate of hydrolysis of the silicon can be controlled, such that the silicon nanoparticle hydrolyses to the bioavailable OSA degradation product. The present inventors have found that treating the surface of the silicon nanoparticle with at least one lipid also stabilises a pharmaceutical or bioactive agent conveyed by the silicon nanoparticle and controls the rate of its release at a target site.

The method further comprises the step of treating the surface of the nanoparticle with at least one amino acid. Advantageously, the addition of amino acids on the surface of the nanoparticle has been found effect the rate of release of a pharmaceutical or bioactive agent conveyed by the silicon nanoparticle, over time.

According to a second aspect of the invention, there is provided a composition comprising the silicon nanoparticles prepared according to the first aspect of the invention, and one or more further ingredients.

According to a third aspect of the invention, there is provided silicon nanoparticles prepared according the first aspect of the invention and a composition according the second aspect of the invention for use as a medicament.

According to a fourth aspect of the invention, there is provided a method for treating a medical condition comprising administering an effective dose of one or more active pharmaceutical ingredients (API) to a subject in need thereof, wherein the API is administered as a pharmaceutical composition according to an embodiment of the second aspect of the invention.

According to a fifth aspect of the invention there is provided a method for providing a cosmetic benefit to a subject comprising administering to said subject a composition according to an embodiment of the second aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

| Figure | Formulation | Sample |
| --- | --- | --- |
| 2 | 1 | Unloaded nanoparticle |
| 3 | 2 | Unloaded nanoparticle |
| 4 | 3 | Unloaded nanoparticle |
| 5 | 4 | Unloaded nanoparticle |
| 6 | 5 | Unloaded nanoparticle |
| 7 | 2 | Nanoparticle loaded with siRNA |
| 8 | 3 | Nanoparticle loaded with siRNA |
| 9 | 4 | Nanoparticle loaded with siRNA |
| 10 | 5 | Nanoparticle loaded with siRNA |

Figure 11:
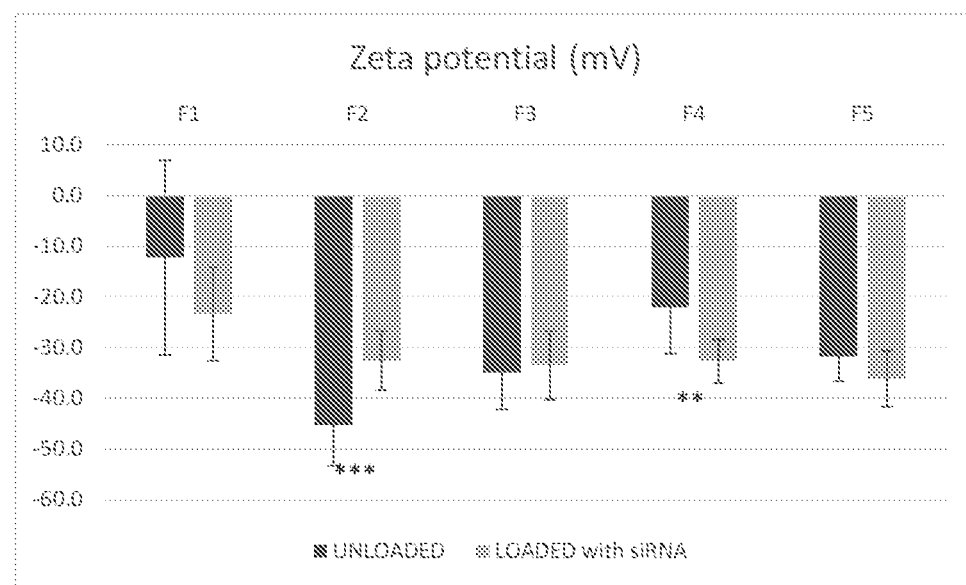

FIG. 11 is a graph comparing the zeta potential for loaded (first of each pair of bars) and siRNA-loaded (second of each pair of bars) for formulations 1 to 5 (labelled F1 to F5). Statistical analysis of difference performed by t-test using GraphPad software.

Figure 12:
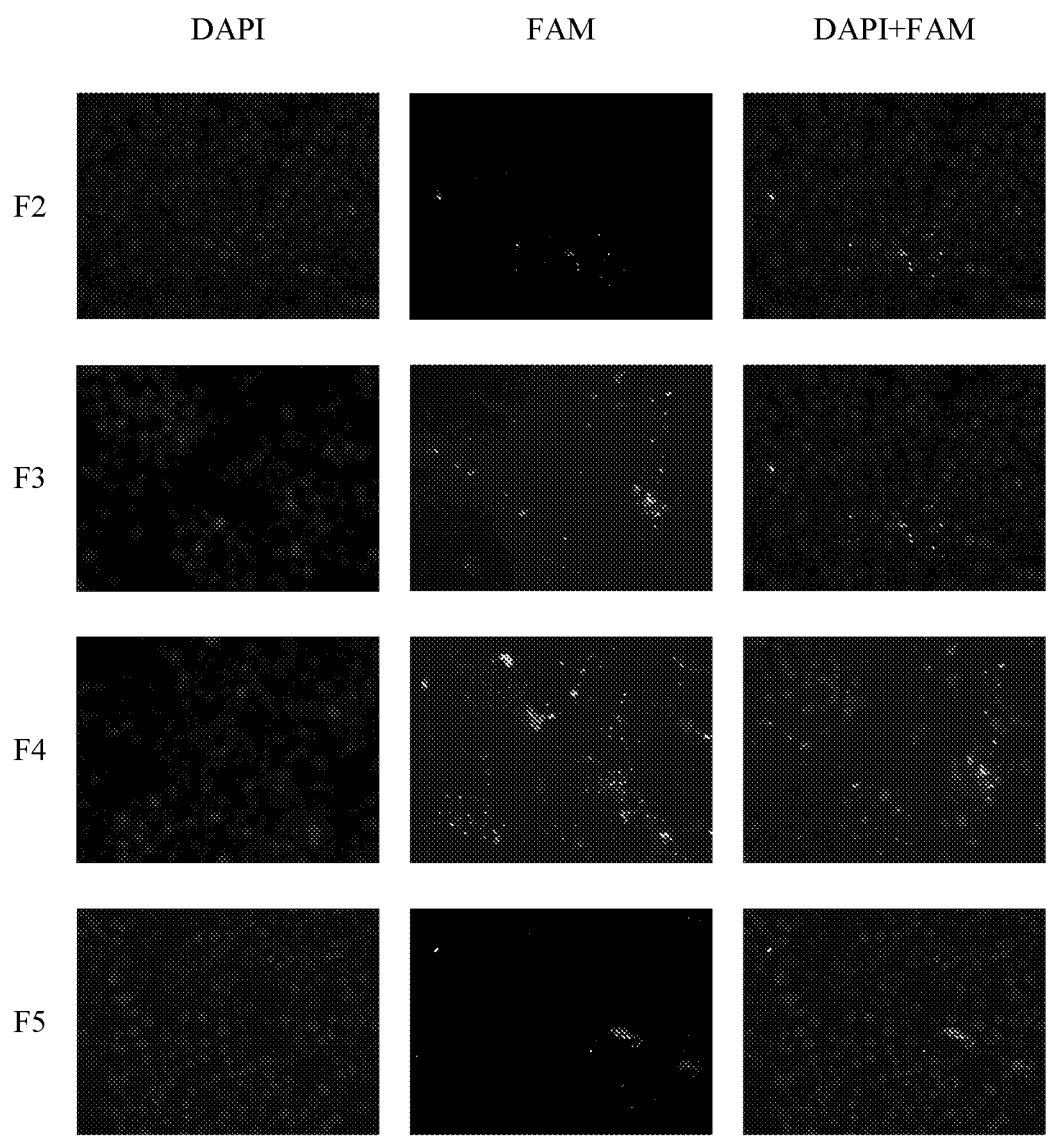

FIG. 12 shows fluorescent photomicrograph of HCE-s cells transfected with formulations 2 to 5 (labelled F2 to F5) loaded with the siGlow green fluorescent tag. Cell nuclei are stained with DAPI (blue, first column) and FAM (green, second column) and images captured after 24 hours.

Figure 13:
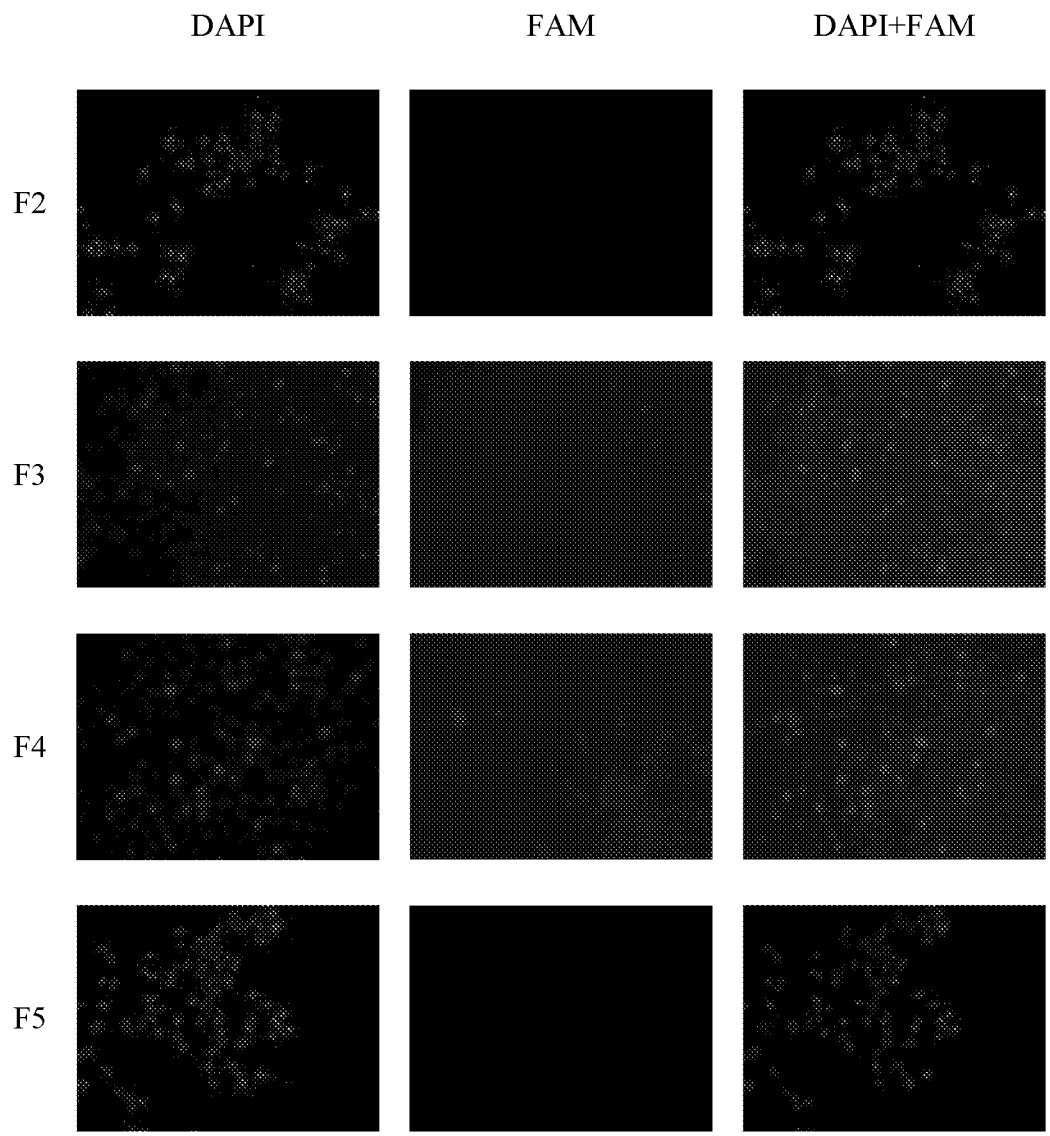

FIG. 13 is a control to FIG. 12. It shows fluorescent photomicrographs of HCE-s cells transfected with formulations 2 to 5 (labelled F2 to F5) which are unloaded. Cell nuclei are stained with DAPI (blue, first column) and FAM (green, second column) and images captured after 24 hours.

Figure 14:
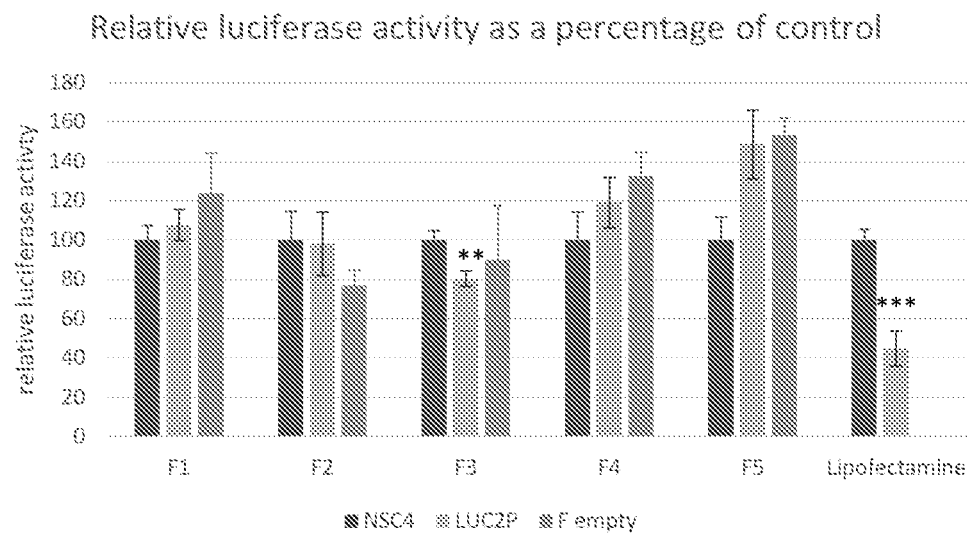

FIG. 14 shows relative luciferase activity obtained from a dual luciferase assay using HCE-S cells that were treated with siRNA-loaded formulation (nonspecific NSC4-loaded in the first bar of three, specific LUC2P-loaded in the middle bar of three or empty formulation in the final bar of three) alongside with a positive Lipofectamine control. The measurements were taken 72 hr after treatment. The y axis represents the firefly to Renilla luciferase ratio expressed as a percentage of NSC4 control. Statistical significance of knockdown indicated by asterisks: $p<0.01$, *$p<0.001$ when compared to nonspecific NSC4 control.

Figure 15:
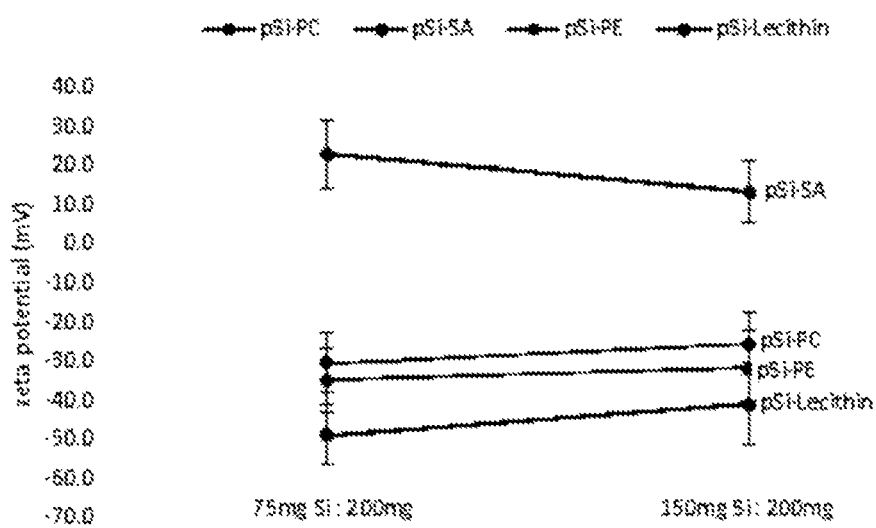
Figure 16:
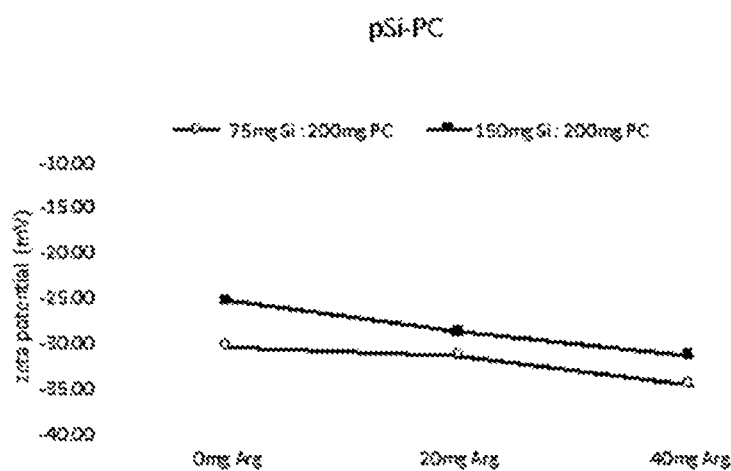

FIG. 15 shows a comparison of zeta potential of silicon nanoparticles loaded with phosphatidylcholine (PC), stearylamine (SA), phosphatidylethanolamine (PE), and lecithin in two different ratios (75 µg Si: 200 µg lipid, and 150 µg Si: 200 µg lipid). The statistically significant differences between samples (analysed by one-way ANOVA followed by Tukey's post hoc) are presented in the table below:

FIG. 16 shows a comparison of zeta potential measured in phosphatidylcholine (PC) treated silicon nanoparticles with various arginine content.

| samples | 75 µg: 200 µg $F_{(3,25)} = 105.33$, $p < 0.0001$ | 150 µg: 200 µg $F_{(3,25)} = 49.46$, $p < 0.0001$ |
| --- | --- | --- |
| pSi-PC vs pSi-SA | p = 0.0000 | p = 0.0000 |
| pSi-PC vs pSi-PE | p = 0.7241 | p = 0.6008 |
| pSi-PC vs pSi-Lecithin | p = 0.0011 | p = 0.0165 |
| pSi-SA vs pSi-PE | p = 0.0000 | p = 0.0000 |
| pSi-SA vs pSi-Lecithin | p = 0.0000 | p = 0.0000 |
| pSi-PE vs pSi-Lecithin | p = 0.0182 | p = 0.2336 |

Figure 17:
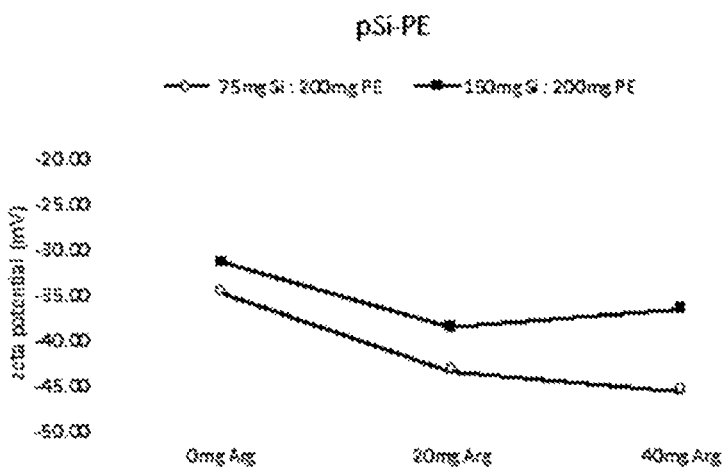

FIG. 17 shows a comparison of zeta potential measured in stearylamine (SA) treated silicon nanoparticles with various arginine content.

Figure 18:
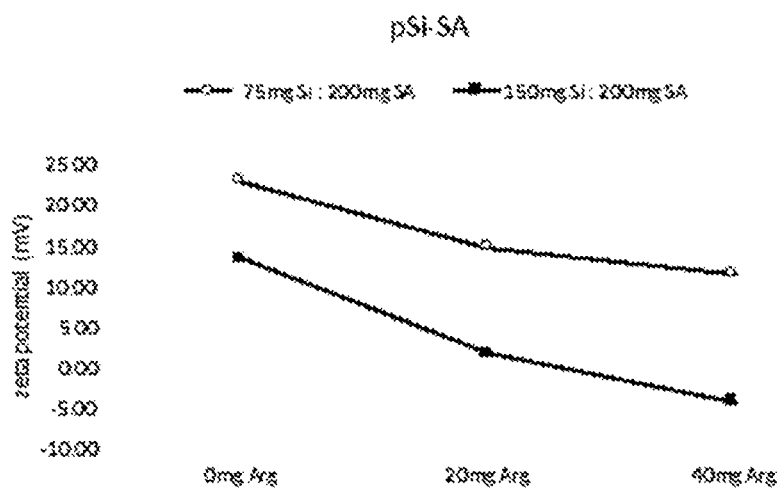

FIG. 18 shows a comparison of zeta potential measured in phosphatidylethanolamine (PE) treated silicon nanoparticles with various arginine content.

Figure 19:
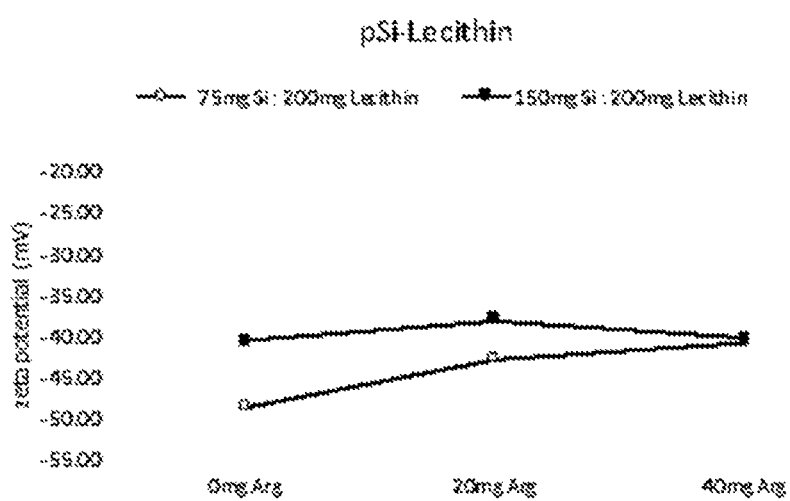

FIG. 19 shows a comparison of zeta potential measured in lecithin treated silicon nanoparticles with various arginine content.

In FIGS. 16 to 19 asterisks indicate statistical significance (*$p<0.05$, $p<0.01$, *$p<0.001$) of differences between samples containing arginine to control (without arginine) sample, evaluated by ANOVA followed by Tukey's post hoc.

Figure 20:
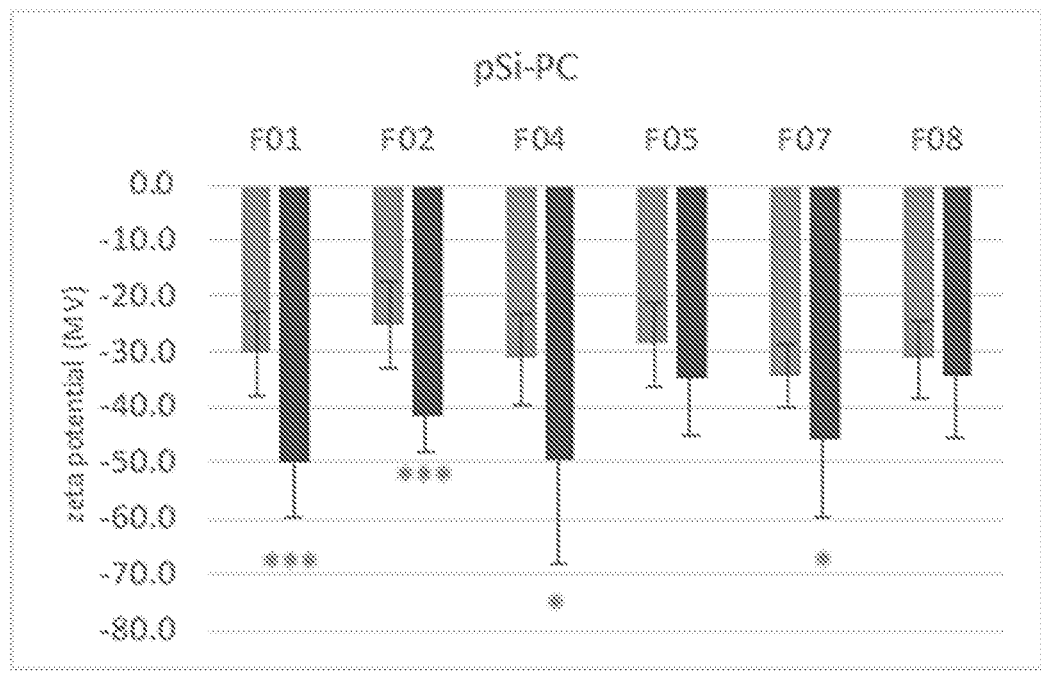
Figure 21:
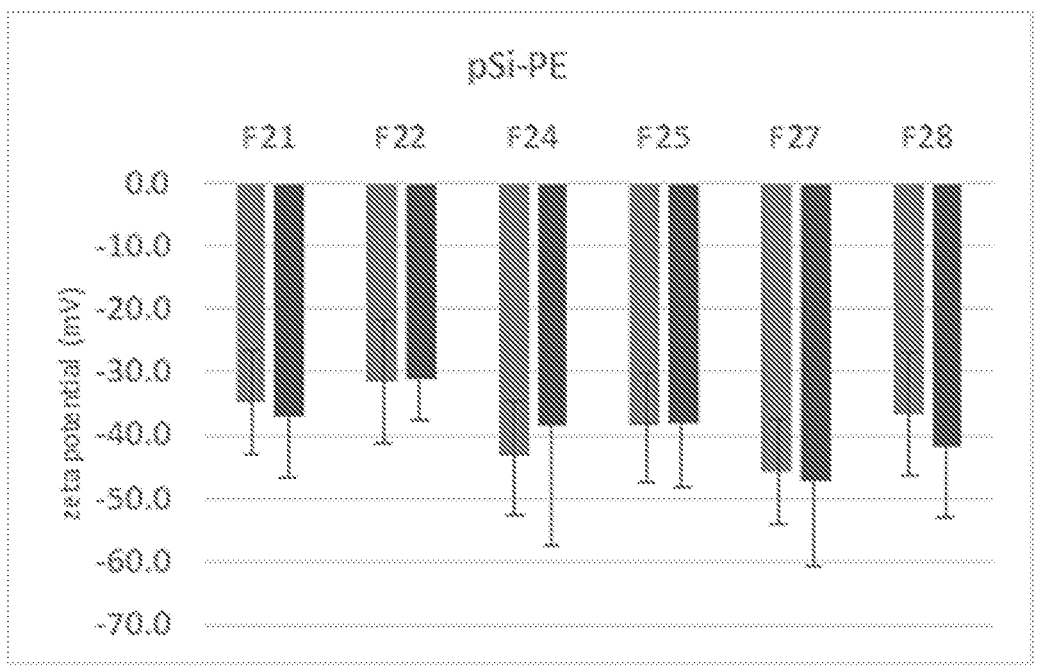
Figure 22:
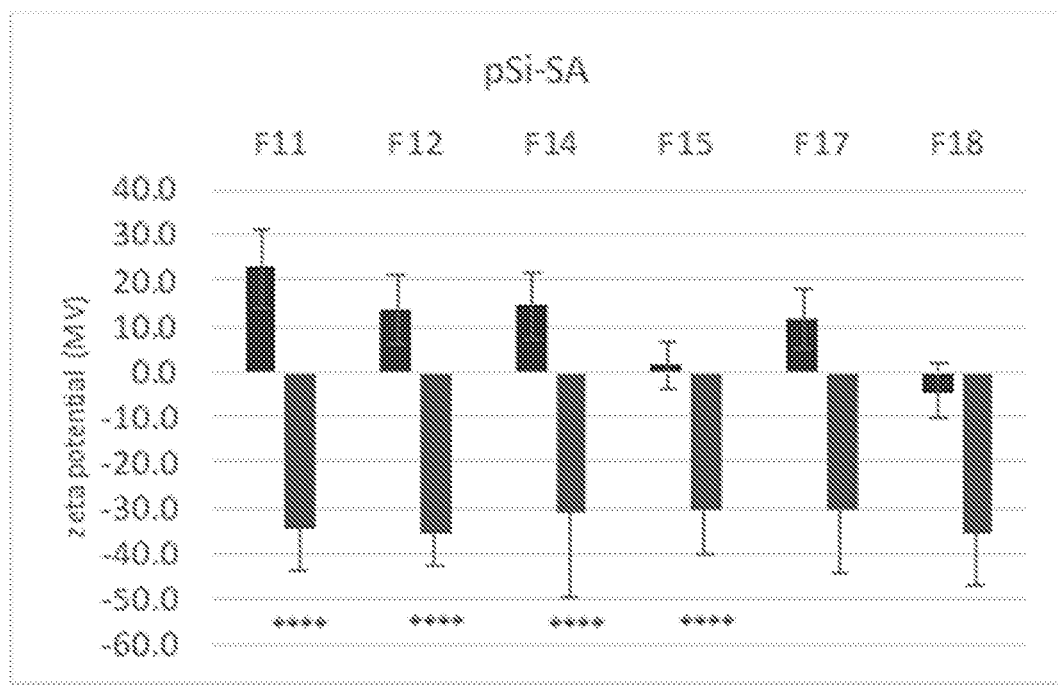
Figure 23:
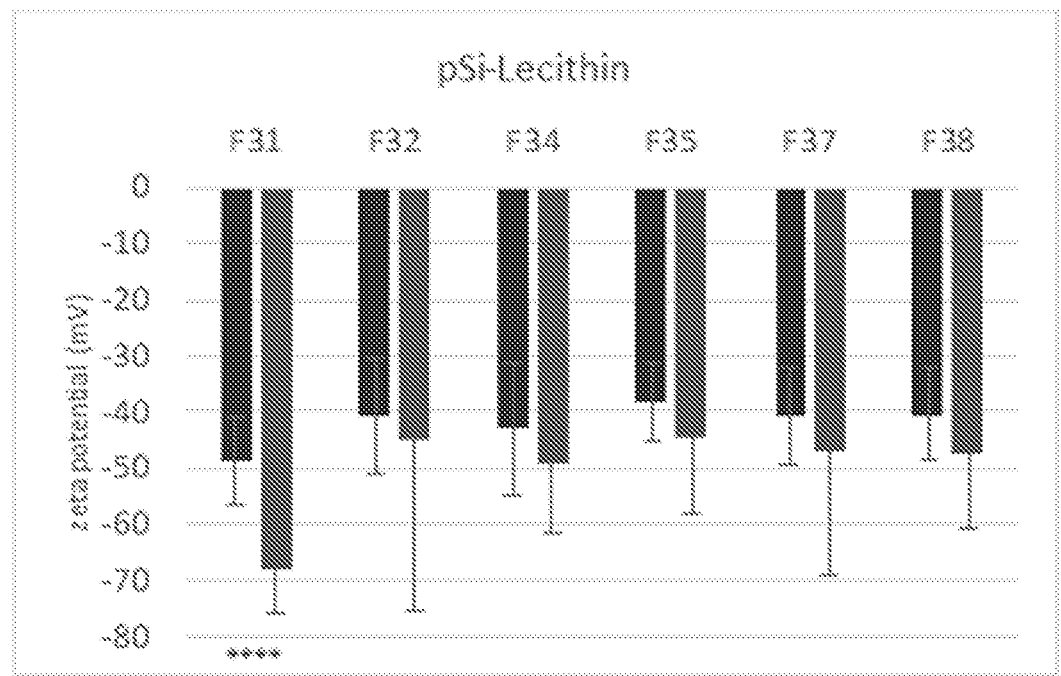

FIGS. 20 to 23 show changes in zeta potential of treated formulations 1 to 38 (labelled F01 to F38) after loading with siRNA. The same amount of siRNA was added to each sample, mixed and incubated for at least an hour at room temperature before measurement taken. The statistical analysis was performed by t-test using GraphPad software and asterisks indicate statistical significance (*$p<0.05$, $p<0.01$, *$p<0.001$) of differences between unloaded and siRNA-loaded sample. FIG. 20 shows data from formulations treated with phosphatidylcholine (PC), FIG. 21 shows data from formulations treated with phosphatidylethanolamine (PE), FIG. 22 shows data form formulations treated with stearylamine (SA), FIG. 23 shows data from formulations treated with lecithin.

Figure 24:
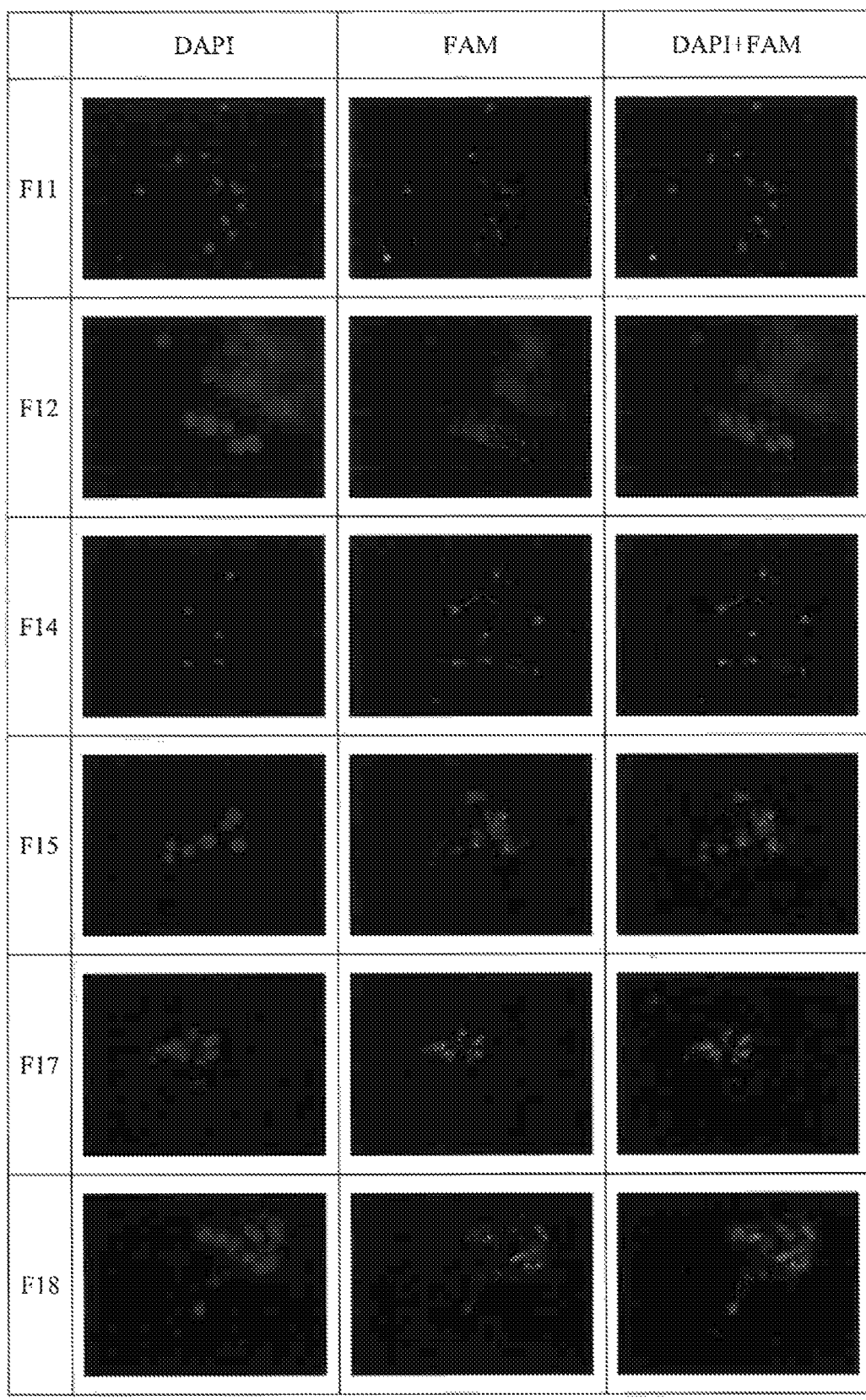

FIG. 24 shows a fluorescence assessment of HCE-S cells transfected with formulations 11, 12, 14, 15, 17, or 18 (F11, F12, F14, F15, F17, F18) loaded with siGlo (labelled with a green fluorescent tag, second column). Cell nuclei are stained with DAPI (blue, first column). Images were taken 24 hr after treatment.

Figure 25:
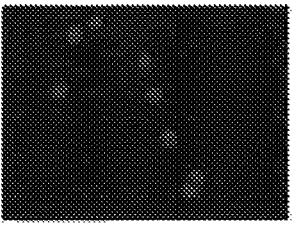
Figure 25:
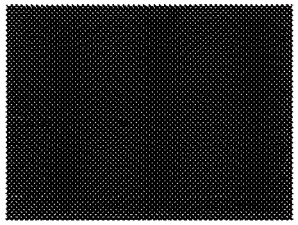
Figure 25:
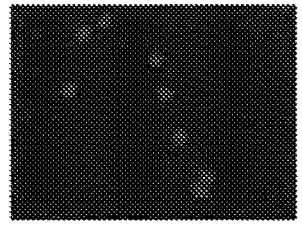
Figure 25:
Figure 25:
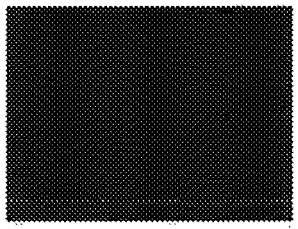
Figure 25:
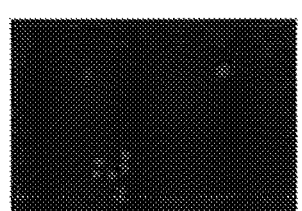
Figure 25:
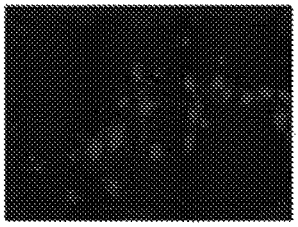
Figure 25:
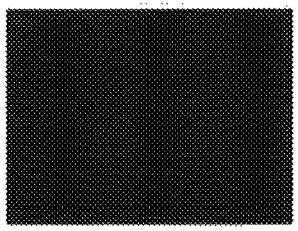
Figure 25:
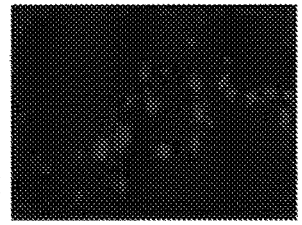
Figure 25:
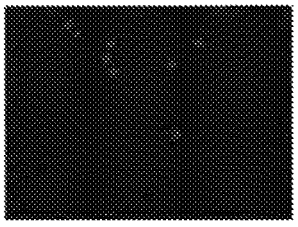
Figure 25:
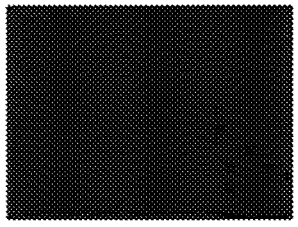
Figure 25:
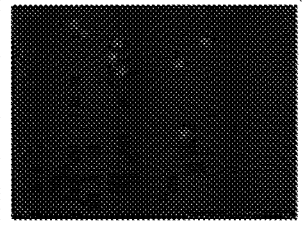
Figure 25:
Figure 25:
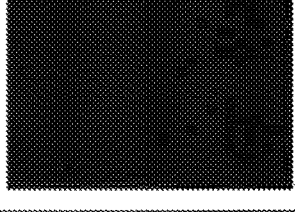
Figure 25:
Figure 25:
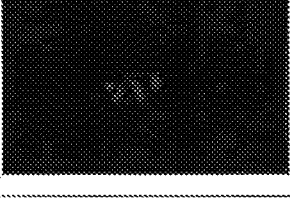
Figure 25:
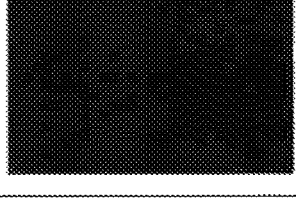
Figure 25:
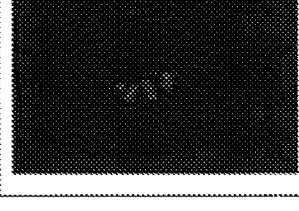

FIG. 25 shows fluorescence assessment of HCE-S cells transfected with unloaded formulations 11, 12, 14, 15, 17 or 18 (F11, F12, F14, F15, F17, F18) for control. Cell nuclei are stained with DAPI (blue, first column). Images were taken 24 hr after treatment.

Figure 26:
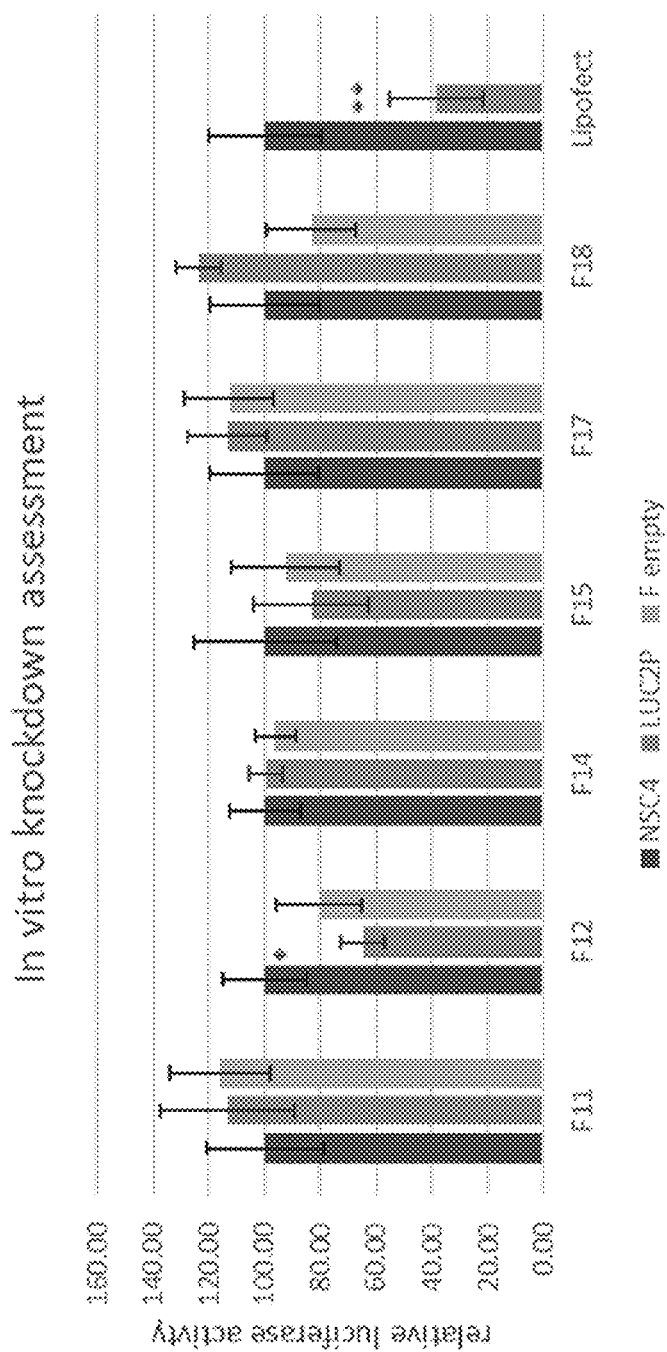

FIG. 26 shows relative luciferase activity obtained from dual luciferase assay using HCE-S cells that were treated with formulations 11, 12, 14, 15, 17 or 18 (nonspecific NSC4-loaded (first bar in each group of 3), specific LUC2P-loaded (second bar in each group) or empty formulation (third bar of each group)) alongside with a positive Lipofectamine control. The measurements were taken 72 hr after treatment. The y axis represents the firefly to Renilla luciferase ratio expressed as a percentage of NSC4 control (according to Table 4). Statistical significance of knockdown indicated by asterisks: *$p<0.05$, **$p<0.01$ when compared to nonspecific NSC4 control.

DETAILED DESCRIPTION

Definitions

According to the present disclosure, a derivative of a compound may be a compound having substantially the same structure, but having one or more substitutions. For example, one or more chemical groups may be added, deleted, or substituted for another group. In certain preferred embodiments, the derivative retains at least part of a pharmaceutical or cosmetic activity of the compound from which it is derived, for example at least 90%, 80%, 70%, 60%, 50%, 40%, 30%, 20% or 10% of an activity of the compound from which it is derived. In some embodiments, the derivative may exhibit an increased pharmaceutical or cosmetic activity compared to the compound from which it is derived.

For example, in the context of a peptide, a peptide derivative may encompass the peptide wherein one or more amino acid residues have been added, deleted or substituted for another amino acid residue. In the case of a substitution, the substitution may be a non-conservative substitution or a conservative substitution, preferably a conservative substitution.

According to a first aspect of the invention there is provided a method for controlling the binding and release of an active pharmaceutical agent (also referred to as an API for example, the API may be a hydrophobic API; the API may be an immunosuppressant, such as a cyclosporin, particularly cyclosporin A, or a derivative thereof) or an active cosmetic agent (also referred to as an ACI—for example, the ACI may be an anti-aging agent, such as an anti-aging lipo-peptide, or a derivative thereof) from a composition comprising silicon nanoparticles, wherein the silicon nanoparticles comprise at least 50% by weight silicon, the method comprising treating the surface of the nanoparticles with at least one lipid (for example, one or more phospholipids and/or one or more further, charged lipids, for example, one or more of phosphatidylcholine, phosphatidylethanolamine, dioleoylphosphatidylethanolamine, stearylamine, lecithin, and derivatives of any thereof) and at least one amino acid (for example, one or more cationic amino acids, or a combination of amino acids wherein one or more of the amino acids is cationic, for example, one or more of arginine and glycine), wherein the ratio of lipid to silicon is 1:1 to 15:1.

Silicon Nanoparticles

According to all aspects of the invention, the composition comprises silicon nanoparticles. They have a nominal diameter of between 5 and 400 nm, for example 20 to 400 nm, for example 50 to 350 nm, for example 80 to 310 nm, for example 100 to 250 nm, for example 120 to 240 nm, for example 150 to 220 nm, for example about 200 nm. They are made of either pure silicon or a hydrolysable silicon-containing material. They are preferably porous. The nominal diameter referred to above, may refer to the mean diameter and at least 90% of total particles in a sample of silicon nanoparticles may fall within the size range specified. They are made of either pure silicon or a hydrolysable silicon-containing material. Silicon nanoparticles can be made porous by standard techniques such as contacting the particles with a hydrofluoric acid (HF)/ethanol mixture and applying a current. By varying the HF concentration and the current density and time of exposure, the density of pores and their size can be controlled and can be monitored by scanning electron micrography and/or nitrogen adsorption desorption volumetric isothermic measurement.

The silicon nanoparticles may be pure silicon or another hydrolysable silicon containing material. If they are not pure silicon, the silicon nanoparticles comprise at least 50% by weight silicon. They preferably comprise at least 60, 70, 80, 90 or 95% silicon and preferably show a rate of hydrolysis (for example in PBS buffer at room temperature) of at least 10% of the rate of hydrolysis of pure silicon particles of the same dimensions. Assays for hydrolysis of silicon-containing material are widely known in the art, for example WO2011/001456. It will be appreciated that silica ($SiO_2$) nanoparticles, which do not comprise 50% by weight elemental silicon, do not fall under the definition of silicon nanoparticles. Nor are silica nanoparticles hydrolysable, since to hydrolyse silica is thermodynamically unfavourable under the conditions present in vivo.

Nanoparticles according to all aspects of the invention are preferably porous. For example, their porosity may increase their surface area by a factor of at least 1.5, 2, 2.5, 3, 3.5 or 4 over the surface area of an equivalently sized non-porous material. In some embodiments, their total surface area is preferably increased by virtue of their porosity by at least 50% or at least 100% over the surface area of a corresponding non-porous particle. In many circumstances porous silicon nanoparticles will in reality have a much greater increase in total surface area by virtue of their porosity.

Preferably, the silicon nanoparticles have an average diameter of between 20-300 nm, from example between 20-290 nm, between 20-280 nm, between 20-270 nm, between 20-260 nm, between 20-250 nm, between 20-240 nm, between 20-230 nm, between 20-220 nm, between 20-210 nm, especially between 20-200 nm.

Advantageously, silicon nanoparticles of this size are ideal for topical skin delivery because they too small to block pilosebaceous ostra or sweat ducts (pores), but their small size allows the particles to actively penetrate to the bottom of the hair follicles rather than merely act as a surface drug reservoir (for example, when the active pharmaceutical or cosmetic agent is a hydrophobic agent for topical skin delivery, such as a hydrophobic peptide or a lipo-peptide, such as cyclosporin A or a derivative thereof, or an anti-aging lipo-peptide or a derivative thereof).

Lipids

According to all aspects of the invention the silicon nanoparticles are surface treated with at least one lipid (for example, one or more phospholipids and/or one or more further, charged lipids, for example, one or more of phosphatidylcholine, phosphatidylethanolamine, dioleoylphosphatidylethanolamine, stearylamine, lecithin, and derivatives of any thereof). It has been found that surface treating the silicon nanoparticle with a lipid aids in controlling the rate of release of an active agent (for example, the active agent may be a hydrophobic active agent; the active agent may be an immunosuppressant, such as a cyclosporin, particularly cyclosporin A, or a derivative thereof, or, alternatively, an anti-aging agent, such as an anti-aging lipo-peptide, or a derivative thereof). Subject to the nature of the active pharmaceutical or cosmetic agent (for example, an immunosuppressant, such as cyclosporin A or a derivative thereof, or an anti-aging agent, such as an anti-aging lipo-peptide or a derivative thereof), the type of lipid used to treat the surface of the nanoparticle (for example, one or more of phosphatidylcholine, phosphatidylethanolamine, dioleoylphosphatidylethanolamine, stearylamine, lecithin, and derivatives of any thereof) affects it rate of release.

Silicon to Lipid Ratio

The ratio of lipid (for example, one or more phospholipids and/or further, charged lipids, for example, one or more of phosphatidylcholine, phosphatidylethanolamine, dioleoylphosphatidylethanolamine, stearylamine, lecithin, and derivatives of any thereof) to silicon is between 1:1 and 15:1, for example between 1:1 and 13:1, 1:1 and 12:1, 1:1 and 11:1, 1:1 and 10:1, 1:1 and 9:1, 1:1 and 8:1, 1:1 and 13:1, 2:1 and 12:1, 2:1 and 11:1, 2:1 and 10:1, 2:1 and 9:1, 2:1 and 8:1, for example between 1:1 and 7:1, between 2:1 and 7:1, between 3:1 and 8:1, between 4:1 and 5:1. Preferably, the ratio of lipid to silicon is between 1:1 and 3:1, more preferably between 1:1 and 8:3. Advantageously, this ratio of lipid to silicon provides a multilamellar vesicle system able to control the release of, and stabilise, a pharmaceutical or bioactive agent (for example, a hydrophobic agent; the agent may be an immunosuppressant, such as a cyclosporin, particularly cyclosporin A or a derivative thereof, or, alternatively, an anti-aging agent, such as an anti-aging lipo-peptide or a derivative thereof) conveyed by the silicon nanoparticle, and to control the release of the bioavailable degradation product of the silicon, OSA.

Advantageously, the lipid compound (for example, one or more phospholipids and/or further, charged lipids, for example one or more of phosphatidylcholine, phosphatidylethanolamine, dioleoylphosphatidylethanolamine, stearylamine, lecithin, and derivatives of any thereof) can exert a significant effect on the surface charge of the silicon nanoparticles. Silicon nanoparticles treated with phosphatidylcholine (PC), phosphatidylethanolamine (PE) and lecithin demonstrate a negative surface charge when zeta potential analysis was performed (ranging from −60 to −20 mV, ratios of Si:Lipid ranging between 1:1 to 1:3). Silicon nanoparticles surface treated with stearylamine demonstrate a positive zeta potential (ranging from 0 to 40 mV, ratios silicon: Lipid ranging from 1:1 to 1:3), when compared to glycine and histidine.

In the method of the first aspect of the invention, the ratio of lipid to silicon is from 1:1 to 15:1. In one embodiment, the method of the first aspect of the invention comprise treating the surface of silicon nanoparticles with at least 30 wt %, typically at least 50 wt % lipid based on the total weight of the coated nanoparticle. It has been found that a lipid to silicon molar ratio of between 1:1 to 3:1 is particularly advantageous, such as between 1:1 and 8:3, for example 1:1, 1.5:1, 2:1, or 2.5:1.

In certain embodiments, the method of the first aspect of the invention comprises treating the surface of silicon nanoparticles with at least 5% by weight phospholipid (for example, one or more of phosphatidylcholine, phosphatidylethanolamine, dioleoylphosphatidylethanolamine, and derivatives of any thereof), for example at least 20 wt %, typically at least 30 wt % and especially at least 50 wt % phospholipid based on the total weight of the coated nanoparticle. It has been found that a lipid to silicon molar or weight ratio of between 1:1 to 3:1 is particularly advantageous, such as between 1:1 and 8:3, for example 1:1, 1.5:1, 2:1, or 2.5:1.

In one embodiment, the phospholipid (for example, one or more of phosphatidylcholine, phosphatidylethanolamine, dioleoylphosphatidylethanolamine, and derivatives of any thereof) has a number average molecular weight in the range of from 500 to 1000. Particularly suitable phospholipids are glycerophospholipids. Particularly suitable phospholipids are those in which the polar head group is linked to quaternary ammonium moieties, such as phosphatidylcholine (PC) or hydrogenated phosphatidylcholine. The type of phospholipid may be selected in dependence of the nature of the formulation with neutral or negatively charges lipid being preferred for aprotic formulation while positive charge and small $CH_3$ chain lipids being preferred for protic formulations. Preferably the side chain(s) is/are (an) aliphatic side chain with 15 or more carbon atoms or an ether side chain with 6 or more repeating ether units, such as a polyethylene glycol or polypropylene glycol chain.

In certain embodiments of the invention where an instantaneous release of the agent from formulation is required, the surface of the silicon nanoparticles can be treated with phosphatidylcholine and other phosphatidylcholine derivatives, such as the didecanoyl-phosphatidylcholine or mirystoil-phosphatidylcholine. This is particularly advantageous where the pharmaceutical or bioactive agent in question, is a cationic substance.

Preferably, the lipid is selected from the group consisting of dioleoylphosphatidylethanolamine (DOPE), lecithin, phosphatidylethanolamine (PE), stearylamine (SA) and phosphatidylcholine (PC) or any combination thereof. Most preferably, the lipid comprises phosphatidylcholine. Preferably, the phosphatidylcholine is present in a weight ratio to silicon of between 1:1 to 3:1, most advantageously from 1:1 to 2:1.

In another embodiment where a prolonged period of drug release is necessary, treating the surface of the silicon nanoparticles with lecithin will allow for high percentage release of the agent.

In a further embodiment, where the active pharmaceutical agent (API) or cosmetic agent (ACI) is anionic, for example short interfering RNA or messenger RNA, the surface of the silicon nanoparticle can be treated with phosphatidylcholine (PC) and/or lecithin.

Lipid to API/ACI Ratio

Preferably, the ratio of lipid (for example, one or more phospholipids and/or other, charged lipids, for example, one or more of phosphatidylcholine, phosphatidylethanolamine, dioleoylphosphatidylethanolamine, stearylamine, lecithin, and derivatives of any thereof) to API/ACI (for example, a hydrophobic API or ACI; the API may be an immunosuppressant, such as a cyclosporin, particularly cyclosporin A or a derivative thereof, or the ACI may be an anti-aging agent, such as an anti-aging lipo-peptide or a derivative thereof) is between 1:0.1 and 15:1, for example between 1:1 and 13:1, 1:1 and 12:1, 1:1 and 11:1, 1:1 and 10:1, 1:1 and 9:1, 1:1 and 8:1, 1:1 and 13:1, 2:1 and 12:1, 2:1 and 11:1, 2:1 and 10:1, 2:1 and 9:1, 2:1 and 8:1, for example between 1:1 and 7:1, between 1:1 and 6:1, particularly between 1:1 and 4:1 and between 1:1 and 2:1. Most preferably, the ratio of lipid to API/ACI is between 1:1 and 4:1, particularly between 1:1 and 3:1. Advantageously, this ratio of lipid to API/ACI provides a structured multilamellar vesicle system able to control the secondary and tertiary special structure of the API associated with Silicon Nanoparticles, especially if the API/ACI is a lipo-peptide (for example, an anti-aging agent, such as an anti-aging lipo-peptide, or a derivative thereof) or an API able to exert a self-assembly behaviour. Alternatively, specified ratios can be conveniently used for stabilizing reciprocal interaction between lipids (for example, one or more phospholipids and/or further, charged lipids, for example, one or more of phosphatidylcholine, phosphatidylethanolamine, dioleoylphosphatidylethanolamine, stearylamine, lecithin, and derivatives of any thereof) and APIs/ACIs (for example, a hydrophobic API or ACI; the API may be an immunosuppressant, such as a cyclosporin, particularly cyclosporin A or a derivative thereof; the ACI may be an anti-aging agent, such as an anti-aging lipo-peptide or a derivative thereof) absorbed onto the silicon nanoparticles' surface. This ratio indeed can exert a further controlling effect on release and stabilisation of a pharmaceutical or bioactive agent conveyed by the silicon nanoparticle, and control the release of bioavailable degradation product of the silicon, OSA.

Amino Acids

According to all aspects of the invention, the lipid treated silicon nanoparticles (for example, silicon nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof) are further treated with an amino acid (such as one or more of arginine and glycine). In its broadest sense, the term "amino acid" encompasses any artificial or naturally occurring organic compound containing an amine (—NH$_2$) and carboxyl (—COOH) functional group. It includes an α, β, γ and δ amino acid. It includes an amino acid in any chiral configuration. According to some embodiments, it is preferably a naturally occurring a amino acid (such as one or more of arginine and glycine). It may be a proteinogenic amino acid or a non-proteinogenic amino acid (such as carnitine, levothyroxine, hydroxyproline, ornithine or citrulline). In an especially preferred embodiment, it is arginine, histidine, or glycine or a mixture of arginine and glycine, most preferably one or more of arginine and glycine.

Accordingly, preferred pharmaceutically or cosmetically compatible compositions of the invention are such that the surface treated nanoparticles (for example, nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof) are associated with the active pharmaceutically or cosmetically agent ("API", for example, a hydrophobic API; the API may be an immunosuppressant, such as a cyclosporin, such as cyclosporin A or a derivative thereof; and "ACI", for example, a hydrophobic ACI; the ACI may be an anti-aging agent, such as an anti-aging lipo-peptide or a derivative thereof) and an amino acid (preferably selected from arginine, glycine, histidine and mixtures thereof, most preferably both arginine and glycine and, in some embodiments, arginine).

According to preferred embodiments, at least 80%, for example at least 90% of the API (for example, a hydrophobic API; the API may be an immunosuppressant, such as a cyclosporin, such as cyclosporin A or a derivative thereof) or ACI (for example, a hydrophobic ACI; the ACI may be an anti-aging agent, such as an anti-aging lipo-peptide or a derivative thereof) by weight present in the products of all aspects of the invention is associated with the surface treated nanoparticles (for example, surface treated nanoparticles wherein the lipid is selected from one or more of phosphatidylcholine, phosphatidylethanolamine, dioleoylphosphatidylethanolamine, stearylamine, lecithin, and derivatives of any thereof, and the amino acid is selected from one or more of arginine and glycine).

Molecular association between an API or ACI (for example, a hydrophobic API or ACI, for example cyclosporin A) and the lipid-treated silicon nanoparticle (for example, a silicon nanoparticle treated with a lipid selected from one or more phospholipids and/or other, charged lipids, for example, one or more of phosphatidylcholine, phosphatidylethanolamine, dioleoylphosphatidylethanolamine, stearylamine, lecithin, and derivatives of any thereof) advantageously ensures that the API or ACI becomes bio-available as the surface treated silicon nanoparticle degrades. The rate of degradation of the composition is governed by the hydrolysis of the silicon nanoparticles. As this rate can be controlled, the rate at which the API or ACI becomes bio-available can also be controlled in order to avoid dose-dumping and/or to ensure release only when the nanoparticles have found their way to a location away from the skin surface (for example a basal location).

Treating the lipid-treated silicon nanoparticles with an amino acid (for example, one or more cationic amino acids, or one or more of a combination of amino acids wherein one or more of the amino acids is cationic, such as one or more of glycine and arginine) has been found to provide a beneficial stabilising effect on a pharmaceutical or bioactive agent loaded onto the silicon nanoparticles. In particular, treating the lipid-treated silicon nanoparticles (for example, nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof) with amino acids (for example, one or more cationic amino acids, or one or more of a combination of amino acids, one or more of which may be cationic, such as one or more of arginine and glycine) has been shown to stabilise the pharmaceutical or bioactive agent in biological fluids.

According to certain embodiments of all aspects of the invention, the lipid-treated silicon nanoparticles (for example, nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof) are further treated with arginine. The surface treatment of silicon nanoparticles with arginine loaded with an API (for example, a hydrophobic API, such as a hydrophobic peptide, such as cyclosporin A or a derivative thereof) demonstrated better API stability in biological fluids.

Ratio of Amino Acid to Silicon

Preferably, the ratio of amino acid (for example one or more cationic amino acids, or a combination of one or more amino acids wherein one or more of the amino acids is cationic, for example one or more of arginine and glycine) to silicon is between 0.05:1 and 2:1, for example between 0.05:1 and 1.8:1, 0.05:1 and 1.6:1, 0.05:1 and 1.4:1, 0.05:1 and 1.2:1, 0.05:1 and 1:1, 0.05:1 and 0.9:1, 0.05:1 and 0.8:1, 0.05:1 and 0.6:1, 0.05:1 and 0.5:1, 0.05:1 and 0.4:1, 0.05:1 and 0.3:1, 0.05:1 and 0.2:1, preferably between 0.2:1 and 0.8:1, especially between 0.3:1 and 0.7:1. Advantageously, this ratio of amino acid to silicon further affects the rate of release of, and stabilises, a pharmaceutical or bioactive agent conveyed by the lipid-treated silicon nanoparticle (for example, nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof).

According to other embodiments of all aspects of the invention, the silicon nanoparticles are treated with a lipid (for example, one or more phospholipids and/or other, charged lipids, for example, one or more of phosphatidylcholine, phosphatidylethanolamine, dioleoylphosphatidylethanolamine, stearylamine, lecithin, and derivatives of any thereof) and an amino acid (for example one or more cationic amino acids, or a combination of one or more amino acids wherein one or more of the amino acids is cationic, for example one or more of arginine and glycine). The amino acid may be any amino acid. Preferably the amino acid is arginine or glycine or a combination of glycine and arginine. The lipid can be any lipid (for example, one or more phospholipids and/or other, charged lipids, for example, one or more of phosphatidylcholine, phosphatidylethanolamine, dioleoylphosphatidylethanolamine, stearylamine, lecithin, and derivatives of any thereof). Preferably the lipid is a phospholipid, more preferably it is PC or hydrogenated PC. Preferably, the ratio of amino acid to silicon is between 0.05:1 to 0.4:1, for example between 0.08:1 and 0.35:1, especially 0.09:1 to 0.32:1. In some embodiments the amino acid is a combination of arginine and glycine, wherein the ratio of Arg: Gly is between 1:0.6 and 3:1, for example between 1:0.8 and 2.5:1, for example between 1:1 to 2:1.

According to other embodiments of all aspects of the invention, the lipid-treated silicon nanoparticles are treated with arginine. The lipid can be any lipid (for example, one or more phospholipids and/or other, charged lipids, for example, one or more of phosphatidylcholine, phosphatidylethanolamine, dioleoylphosphatidylethanolamine, stearylamine, lecithin, and derivatives of any thereof). Preferably the lipid is a phospholipid such as PC or hydrogenated PC. Preferably, the ratio of arginine to silicon is between 0.05:1 to 0.4:1, for example between 0.08:1 and 0.35:1, especially 0.09:1 to 0.32:1. Advantageously, such ratios have been found to provide a high rate of API (for example, a hydrophobic API; the API may be an immunosuppressant, such as a cyclosporin, for example cyclosporin A, or a derivative thereof) and ACI (for example, an anti-aging agent, such as an anti-aging lipo-peptide, or a derivative thereof) release.

In formulations comprising PC and arginine, which are preferred in some embodiments, the ratio of silicon to PC is between 1:1 and 3:1 and the ratio of silicon to arginine is between 4:1 and 8:1.

Arginine present at ratios lower than 0.2:1 (Arg: Si) is not effective in enhancing the release of the API. Nevertheless even in these low amounts, arginine contributes to the stability of the API (for example, the stability of a hydrophobic API; the API may be an immunosuppressant, such as a cyclosporin, for example cyclosporin A, or a derivative thereof). Furthermore, the presence of arginine in low amounts further enhances the stability of released OSA. When larger amounts of arginine are used, the excess amino acid contributes to the formation of temporary soluble aggregates of peptide. This is especially the case if the peptides are formed by charged and polar amino acids (for example, arginine). The effect of the formation of such peptide aggregates is a decrease in the amount of released active. Similarly, formation of such peptides also inhibits the release of OSA.

According to certain embodiments of all aspects of the invention, the lipid treated nanoparticles (for example, nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof) are further treated with histidine. Advantageously, an enhanced API stability (for example, the stability of a hydrophobic API; the API may be an immunosuppressant, such as a cyclosporin, for example cyclosporin A, or a derivative thereof) is observed for histidine when used in combination with any lipid type. This could be attributable to a better buffering effect in the range pH 5.12 to pH 7.12, for the resultant composition. Preferably, the ratio of histidine to silicon is between 0.05:1 to 0.4:1, for example between 0.08:1 and 0.5:1, especially 0.35:1 to 0.45:1.

Advantageously, this ratio allows for a high rate of API release (for example, for a hydrophobic API, such as a cyclosporin, for example cyclosporin A or a derivative thereof). Preferably the lipids used in combination with histidine are PC, hydrogenated PC or lecithin.

According to certain embodiments of all aspects of the invention, the lipid treated nanoparticles (for example, nanoparticles treated with one or more phospholipids and/or other, charged lipids, for example, one or more of phosphatidylcholine, phosphatidylethanolamine, dioleoylphosphatidylethanolamine, stearylamine, lecithin, and derivatives of any thereof) is further treated with glycine. Advantageously, glycine facilitates cytoplasmic permeation of the silicon nanoparticles within animal or human cells. High ratio of glycine to silicon favored an increased rate of release of the API (for example, release of a hydrophobic API, such as a cyclosporin, for example cyclosporin A or a derivative thereof).

According to other embodiments of all aspects of the invention, the silicon nanoparticle is surface treated with hydrogenated PC and glycine. Advantageously, such compositions enable API release (such as the release of a hydrophobic API, such as a cyclosporin, for example cyclosporin A or a derivative thereof) to reach a plateau over time. In particular a controlled release of the drug was observed over a 12 hour period.

In some embodiments of the second aspect of the invention, there is provided a composition comprising silicon nanoparticles surface treated with at least one lipid (for example, one or more phospholipids and/or other, charged lipids, for example, one or more of phosphatidylcholine, phosphatidylethanolamine, dioleoylphosphatidylethanolamine, stearylamine, lecithin, and derivatives of any thereof) and at least one amino acid for use as a delivery system for prolonged drug release over time.

Oils

In certain embodiments of all aspects of the invention, the composition further comprises at least one oil. Advantageously, the inclusion of oils into the composition of the invention has the beneficial effect of odor masking, and an enhanced skin permeation/penetration rate of the API (for example, when the API is a hydrophobic API; the API may be an immunosuppressant, such as a cyclosporin, for example cyclosporin A or a derivative thereof) or ACI is observed (for example, when the ACI is an anti-aging agent, such as an anti-aging lipo-peptide, or a derivative thereof) along with the formation of an amphiphilic interface able to overcome precipitation due to a poor solubility at an oil/water interface.

In preferred embodiments, the oils are selected from limonene, coconut oil, oregano oil, sesame oil or combinations thereof.

In certain embodiments, the oils are selected from limonene, coconut oil or a combination thereof. Advantageously, the use of such oils has been demonstrated to be effective at masking odors such as fish oils (for example, omega 3 fish oil).

In certain embodiments, the oils are selected from limonene, oregano oil, sesame oil or a combination thereof. Preferably, the composition comprises oregano and sesame oil. Advantageously, these oils have been demonstrated to facilitate the loading, vehiculating and delivery of an API for providing a fish vaccine. In certain embodiments the ratio of silicon nanoparticle:oregano oil:sesame oil is 1.6:4.5:3.8.

In another embodiment of all aspects of the invention, the oil is limonene. Advantageously, the inclusion of limonene in the composition has been shown to enhance the rate of skin permeation of an API (for example, when the API is a hydrophobic API; the API may be an immunosuppressant, such as a cyclosporin, for example cyclosporin A or a derivative thereof) or ACI (for example, a hydrophobic ACI; the ACI may be an anti-aging agent, such as an anti-aging lipo-peptide, or a derivative thereof) loaded onto the silicon nanoparticles, when compared to a silicon nanoparticles without the additional oil component. In particular, the embodiments of the second aspect of the invention that further comprise oils have been found to improve the amphiphilic nature of the nanoparticles to overcome the poor water in oil distribution of the API-loaded silicon nanoparticles. This is especially true when the API or ACI is a hydrophobic peptide or lipo-peptide (for example, when the API is a hydrophobic peptide, such as cyclosporin A, or a derivative thereof, or when the ACI is a lipo-peptide, such as an anti-aging lipo-peptide, or a derivative thereof).

According to certain embodiments of the invention (for example, when the API is a hydrophobic API), the at least one oil is present in the composition at wt % of between 1000 and 10, for example between 500 and 50, especially between 250 and 80.

Table 1. Preparation of SAMPLE 1: Weight and ratio of materials used in the protocol for silicon nanoparticles comprising 20 mg of API

| Samples | API | SiNPs | Lec | Arginine | Glycine | Limonene | Samples | Method |
|---|---|---|---|---|---|---|---|---|
| S1 | 20 mg | 4.0 mg | 8.0 mg | 400 μg | 200 μg | 1000 μL ≈ 841 mg | F1, F4, and F6 | melting |
| S2 | 20 mg | 4.0 mg | 8.0 mg | 400 μg | 200 μg | 400 μL ≈ 340 mg | F2 and F5 | suspension |

Further Components

In certain embodiments of all aspects of the invention, the composition further comprises loading the silicon nanoparticles with charged API or ACI (for example, a charged lipo-peptide or a derivative thereof). In certain embodiments of all aspect of the invention, the silicon nanoparticles are loaded with a cationic API or ACI. In another aspect of all embodiments of the invention, the silicon nanoparticles are loaded with an anionic API or ACI.

The composition of the invention preferably further comprises one or more active pharmaceutical ingredients (for example, a hydrophobic API; the API may be an immunosuppressant, such as a cyclosporin, for example cyclosporin A or a derivative thereof). For example, each API may be present at up to 0.1%, 0.5%, 1%, 2%, 4%, 6%, 8% or 10% by weight of the total composition.

The API is preferably located in association with the silicon nanoparticles.

The API may advantageously be hydrophobic, for example a hydrophobic peptide or a hydrophobic lipo-peptide. For example, the API may be a hydrophobic peptide, such as cyclosporin A or a derivative thereof.

According to certain embodiments the API or APIs may be selected from:
nonsteroidal anti-inflammatory drugs such as, but not limited to, Aceclofenac, Diclofenac, Celecoxib, choline and magnesium salicylates, Ibuprofen, Naproxen, Piroxicam (NSAID category);
anti-inflammatory and immunosuppressive agents such as but not limited to cyclosporine, for example cyclosporin A or a derivative thereof, hydrocortisone and related derivatives, and corticosteroids for example prednisone and dexamethasone; and steroids;
analgesics and antipyretics, such as but not limited to, Acetaminophen, and acetylsalicylic acid;
anti-fungal actives, such as but not limited to Griseofulvin, Miconazole, Fluconazole, Itraconazole, Oxiconazole, Econazole, Bifonazole as free base and related salts, for example as nitrate salts (anti-fungal category);
antiviral and anti-parasitic drugs such as, but not limited to, Acyclovir, Ganciclovir, Valacyclovir, Metronidazole and Tinidazole, Amphotericin (antiviral/anti-parasite category);
antibiotics such as, but not limited to, Gentamicin, Nystatin, Clindamycin;
Anticancer drug and or adjuvants for anticancer therapy such as, but not limited to, Taxol, Methotrexate, curcumin, Aloe-emodin;
anaesthetics (liquid forms);
non-depolarising muscle relaxants;
opioid analgesics;
cannabinoids and benzodiazepines;
antiepileptic drugs;
peptides and/or amino acids;
hormones;
mRNA;
siRNA;
other nucleic acids.

In other embodiments, the composition of the invention preferably further comprises one or more active cosmetic ingredients (ACIs, such as an anti-aging agent, such as an anti-aging lipo-peptide, or a derivative thereof), for example each ACI may be present at up to 0.1%, 0.5%, 1%, 2%, 4%, 6%, 8% or 10% by weight of the total composition.

The ACI (such as an anti-aging agent, such as an anti-aging lipo-peptide or a derivative thereof) is preferably located in association with the silicon nanoparticles. In certain embodiments, the composition of the second aspects of the invention further comprises both an API and an ACI substantially located in association with silicon nanoparticle.

The ACI may be hydrophobic. Advantageously, the ACI may comprise one or more hydrophobic moieties and/or hydrophilic moieties.

The ACI may be a peptide or a lipo-peptide. Where the ACI is a lipo-peptide, such as an anti-aging lipo-peptide, the peptide moiety may be hydrophilic, while the lipid moiety is hydrophobic. For example, when the ACI is an anti-aging lipopeptide, the ACI may be a 5-mer peptide lipidated at the N-terminus.

According to certain embodiments the ACI or ACIs may be selected from:
glycyrrhizin acid (AKA Liquorice extract), Kojic acid or more generally whitening agents for skin products;
antioxidants (such as plant extracts, for example Lupinus a/bus extract) and vitamins;
peptides;
copper peptide (6-Amino-2-[[2-[(2-aminoacetyl)amino]-3-(1H-imidazol-5-yl)propanoyl]amino]hexanoic acid, with or without copper ions);
alpha-hydroxy acids;
beta-hydroxy acids;
hydroquinone;
retinol;
L-ascorbic acid;
hyaluronic acid;

an anti-aging agent (for example, an anti-aging lipopeptide).

While it is possible for the composition of the present invention to be administered alone, it is preferable for the composition to be present in a pharmaceutical or cosmetic composition.

Accordingly, the second aspect of the invention, provides a composition of the invention, and one or more further ingredients. Whilst those further ingredients normally include one or more excipients, they may also optionally include one or more further active agents.

The compositions according to the invention include those suitable for oral, parenteral (including subcutaneous, intradermal, intramuscular, intravenous, and intra-articular), inhalation (including fine particle dusts or mists which may be generated by means of various types of metered dose pressurized aerosols, nebulizers or insufflators), rectal and topical (including dermal, transdermal, transmucosal, buccal, sublingual, and intraocular) administration, although the most suitable route may depend upon, for example, the condition and disorder of the recipient.

The compositions may conveniently be presented in unit dosage form and may be prepared by any of the methods well known in the field of formulation. All methods include the step of bringing the active ingredient into association with the carrier which constitutes one or more accessory ingredients. In general the compositions are prepared by uniformly and intimately bringing into association the silicon nanoparticles with liquid carriers or finely divided solid carriers or both and then, if necessary, shaping the product into the desired formulation.

Compositions of the present invention suitable for oral administration may be presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. The active ingredient may also be presented as a bolus, electuary or paste. Various pharmaceutically acceptable carriers and their formulation are described in standard formulation treatises, e.g., Remington's Pharmaceutical Sciences by E. W. Martin. See also Wang, Y. J. and Hanson, M. A., Journal of Parenteral Science and Technology, Technical Report No. 10, Supp. 42:2S, 1988, the contents of which are incorporated herein by reference.

A tablet may be made by compression or moulding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Moulded tablets may be made by moulding in a suitable machine a mixture of the powdered compound moistened with an inert liquid diluent. The tablets may optionally be coated or scored and may be formulated so as to provide slow or controlled release of the active ingredient therein.

Exemplary compositions for oral administration include suspensions which can contain, for example, microcrystalline cellulose for imparting bulk, alginic acid or sodium alginate as a suspending agent, methylcellulose as a viscosity enhancer, and sweeteners or flavoring agents such as those known in the art; and immediate release tablets which can contain, for example, microcrystalline cellulose, dicalcium phosphate, starch, magnesium stearate and/or lactose and/or other excipients, binders, extenders, disintegrants, diluents and lubricants such as those known in the art. Molded tablets, compressed tablets or freeze-dried tablets are exemplary forms which may be used. Exemplary compositions include those formulating the present compound(s) with fast dissolving diluents such as mannitol, lactose, sucrose and/or cyclodextrins. Also included in such formulations may be high molecular weight excipients such as celluloses (avicel) or polyethylene glycols (PEG). Such formulations can also include an excipient to aid mucosal adhesion such as hydroxypropyl cellulose (HPC), hydroxypropyl methyl cellulose (HPMC), sodium carboxy methyl cellulose (SCMC), maleic anhydride copolymer (e.g., Gantrez), and agents to control release such as polyacrylic copolymer (e.g. Carbopol 934). Lubricants, glidants, flavors, coloring agents and stabilizers may also be added for ease of fabrication and use.

Compositions for parenteral administration include aqueous and non-aqueous sterile injection solutions which may contain anti-oxidants, buffers, bacteriostats and solutes which render the composition isotonic with the blood of the intended recipient; and aqueous and non-aqueous sterile suspensions which may include suspending agents and thickening agents. The compositions may be presented in unit-dose or multi-dose containers, for example sealed ampoules and vials, and may be stored in a freeze-dried (lyophilised) condition requiring only the addition of the sterile liquid carrier, for example saline or water-for-injection, immediately prior to use. Exemplary compositions for parenteral administration include injectable suspensions of the composition of the invention which can further contain, for example, suitable non-toxic, parenterally acceptable diluents or solvents, such as mannitol, 1,3-butanediol, water, Ringer's solution, an isotonic sodium chloride solution, or other suitable dispersing or wetting and suspending agents, including synthetic mono- or diglycerides, and fatty acids, including oleic acid, or Cremaphor. An aqueous carrier may be, for example, an isotonic buffer solution at a pH of from about 3.0 to about 8.0, preferably at a pH of from about 3.5 to about 7.4, for example from 3.5 to 6.0, for example from 3.5 to about 5.0. Useful buffers include sodium citrate-citric acid and sodium phosphate-phosphoric acid, and sodium acetate/acetic acid buffers. The composition preferably does not include oxidizing agents and other compounds that are known to be deleterious to any active ingredient. Excipients that can be included are, for instance, proteins, such as human serum albumin or plasma preparations. If desired, compositions may also contain minor amounts of non-toxic auxiliary substances, such as wetting or emulsifying agents, preservatives, and pH buffering agents and the like, for example sodium acetate or sorbitan monolaurate.

Exemplary compositions for nasal aerosol or inhalation administration include solutions in saline, which can contain, for example, benzyl alcohol or other suitable preservatives, absorption promoters to enhance bioavailability, and/or other solubilizing or dispersing agents such as those known in the art. Conveniently in compositions for nasal aerosol or inhalation administration the composition of the invention may be delivered in a suitable powder inhaler. Capsules and cartridges of e.g., gelatin for use in such an inhaler can be formulated to contain a powder mix of the compound and a suitable powder base, for example lactose or starch.

Compositions for rectal administration may be presented as a retention enema or a suppository with the usual carriers such as cocoa butter, synthetic glyceride esters or polyethylene glycol. Such carriers are typically solid at ordinary temperatures, but liquefy and/or dissolve in the rectal cavity to release the drug.

The composition of the invention may be suitable for topical administration. For example, the composition of the invention may be suitable for topical application to the skin. When the composition of the invention comprises an API which is hydrophobic, the composition of the invention may be administered topically. When the composition of the invention comprises an immunosuppressant, for example a cyclosporin, such as cyclosporin A or a derivative thereof, the composition of the invention may be administered topically. When the composition of the invention comprises an ACI which is an anti-aging agent, for example an anti-aging lipo-peptide or a derivative thereof, the composition of the invention may be administered topically.

Compositions for topical administration in the mouth, for example buccally or sublingually, include lozenges comprising the active ingredient in a flavoured base such as sucrose and acacia or tragacanth, and pastilles comprising the active ingredient in a basis such as gelatin and glycerine or sucrose and acacia. Exemplary compositions for topical administration include a topical carrier such as Plastibase (mineral oil gelled with polyethylene).

According to some embodiments a pharmaceutical composition of the invention is a unit dosage composition containing a single effective dose, or an appropriate fraction thereof, of the API or APIs.

It should be understood that in addition to the ingredients particularly mentioned above, the compositions of this invention may include other agents conventional in the art having regard to the type of composition in question, for example those suitable for oral administration may include flavouring agents.

The composition of the invention may also be suitably administered as sustained release systems. Suitable examples of sustained release systems of the invention include suitable polymeric materials, for example semi permeable polymer matrices in the form of shaped articles, e.g., films, or microcapsules; suitable hydrophobic materials, for example as an emulsion in an acceptable oil; or ion exchange resins; and sparingly soluble derivatives of the compound of the invention, for example, a sparingly soluble salt. Sustained release systems may be administered orally; rectally; parenterally; intracisternally; intravaginally; intraperitoneally; topically, for example as a powder, ointment, gel, drop or transdermal patch; buccally; sublingually, or as an oral or nasal spray.

A therapeutically effective amount of an API or a cosmetically effective amount of an ACI may be administered as a single pulse dose, as a bolus dose, or as pulse doses administered over time, for example during the course of a day, during the course of a week, or during the course of a month.

In many preferred embodiments, the composition of the invention is a topical cream or gel, for example it may comprise a pharmaceutically compatible or a cosmetically compatible cream or gel suitable for topical application to the skin or another body surface comprising a cream base into which composition of the invention is suspended. For example, when the API or ACI is a hydrophobic API or ACI, such as cyclosporin A or a derivative thereof, or an anti-aging lipo-peptide or a derivative thereof, the composition of the invention may be in a topical cream or gel.

A pharmaceutically or cosmetically compatible cream comprises a cream base. Cream bases are typically emulsions of water in oil or oil in water. Preferably, they are oil in water emulsions where the oil phase contains a mixture of lipids, sterols and emollients. For example, when the API or ACI is cyclosporin A or a derivative thereof, or an anti-aging lipo-peptide or a derivative thereof, the composition of the invention may be in a pharmaceutically or cosmetically compatible cream which comprises a cream base.

A pharmaceutically or cosmetically compatible gel comprises the composition of the invention dispersed in the liquid phase of the gel. The gel is preferably a hydrogel (colloidal gel) comprising cross-linked polymers such as polyethylene oxide, polyacrylamides or agarose, methylcellulose, hyaluronan, elastin-like polypeptide, carbomer (polyacrylic acid), gelatin or collagen. For example, when the API or ACI is cyclosporin A or a derivative thereof, or an anti-aging lipo-peptide or a derivative thereof, the composition of the invention may be dispersed in the liquid phase of a pharmaceutically or cosmetically compatible gel.

A composition of the invention may be in the form of an adhesive patch comprising a backing layer and an adhesive film wherein the adhesive film comprises the composition according to the invention or a cream or gel comprising the composition according to the invention. For example, when the API or ACI is cyclosporin A or a derivative thereof, or an anti-aging lipo-peptide or a derivative thereof, the composition of the invention may be in the form of such an adhesive patch.

A patch according to the invention is typically a transdermal patch and consists of a backing layer, which may be textile, polymer or paper and protects the patch from the outer environment; optionally a membrane, for example a polymer membrane which prevents migration of the fluorouracil through the backing layer; and an adhesive. The composition of the invention may be provided in the adhesive layer or in a reservoir of the patch or a gel may act as a reservoir within the patch product (a so-called "monolithic" device).

A patch can be useful in ensuring the correct dosage of a subject by decreasing the likelihood of incautious or inappropriate use by the final user. Moreover, a patch will limit the area treated, avoiding inadvertent spreading to other areas.

According to a third aspect of the invention, there is provided the composition of the invention for use as a medicament.

Optionally, the medicament may be use in treating a subject in need of an API included in the composition of the invention (for example, a hydrophobic API; the API may be an immunosuppressant, such as a cyclosporin, for example cyclosporin A or a derivative thereof).

For example if the composition of the invention includes an anti-inflammatory drug the medicament may be for use in treating or preventing inflammation, injury or pain.

If the composition of the invention includes immunosuppressive agents (for example, cyclosporin A or a derivative thereof) the medicament may be for use in treating or preventing psoriasis, atopic dermatitis, hypersensitivity, allergy, transplanted organ rejection, hayfever, pet allergy, allergic rhinitis or urticaria, particularly psoriasis or atopic dermatitis.

If the composition of the invention includes analgesics or antipyretics, the medicament may be used for treating or preventing pain or fever.

If the composition of the invention includes an anti-fungal agent, the medicament may be used for treating or preventing a fungal infection, for example Candidiasis, cryptococcal meningitis, athletes foot, jock-itch or fungal nail infection.

If the composition of the invention includes an anti-viral compound, the medicament may be used for treating or preventing a viral infection.

If the composition of the invention includes an anti-parasitic compound, the medicament may be used for treating or preventing a parasitic infection or infestation.

If the composition of the invention includes an antibacterial compound such as an antibiotic, the medicament may be used for treating or preventing a bacterial infection.

If the composition of the invention includes an anti-neoplastic compound, the medicament may be used for treating or preventing a neoplastic condition such as cancer, in particular it may be used for treating a cancer of the skin or other body surface to which the product of the invention may be topically applied.

If the composition of the invention includes an anaesthetic, the medicament may be used for inducing or sustaining a state of anaesthesia in a subject.

If the composition of the invention includes a muscle relaxant, the medicament may be used for providing muscle relaxation in a subject, for example as a treatment for a spastic condition, a condition characterised by spasms, or for use as pre-medication prior to surgery.

If the composition of the invention includes an antihypertensive agent, the medicament may be used for treating or preventing hypertension.

If the composition of the invention includes an anti-anxiety agent, the medicament may be used for treating or preventing anxiety.

lithe composition of the invention includes a hormone, the medicament may be used to treat or prevent a condition caused by hormone deficiency such as a menopausal disorder, or diabetes, a growth disorder, hypogonadism, a thyroid disorder, or osteoporosis.

lithe composition of the invention includes a contraceptive agent, the medicament may be used to prevent pregnancy.

lithe composition of the invention includes an antidepressant, the medicament may be used to treat or prevent depression.

lithe composition of the invention includes an antiepileptic agent, the medicament may be used to treat or prevent epilepsy.

lithe composition of the invention includes a somnulant, the medicament may be used to treat or prevent insomnia.

lithe composition of the invention includes an antiemetic, the medicament may be used to treat or prevent nausea and/or vomiting.

lithe composition of the invention included an antipsychotic compound, the medicament may be used to treat or prevent psychosis.

If the composition of the invention includes a spermicidal compound, the medicament may be used as a spermicide, optionally in combination with a barrier contraceptive device.

If the composition of the invention includes an erectile dysfunction (ED) drug, the medicament may be used to treat or prevent erectile dysfunction and or male impotence.

In the composition of the invention includes an ocular lubricant the medicament may be used to treat or prevent a dry eye condition.

If the composition of the invention includes a laxative, the medicament may be used to treat or prevent constipation.

If the composition of the invention includes a bile acid sequestrant or a bowel bulking agent or a serotonin agonist, the medicament may be used to treat or prevent diarrhoea.

If the composition of the invention includes an appetite suppressant, the medicament may be used to treat or prevent obesity.

According to a fourth aspect of the invention, there is provided a method of treating a medical condition comprising administering an effective dose of one or more active pharmaceutical ingredients (APIs, for example one or more hydrophobic APIs, for example cyclosporin A or a derivative thereof) to a subject in need thereof, wherein the APIs are administered as a pharmaceutical composition according to an embodiment of the second aspect of the invention.

According to certain preferred embodiments of the fourth aspect of the invention, the medical condition is one of the medical conditions referred to above in reference to the fourth aspect of the invention, and the API is optionally one of the pharmaceutically active agents referred to above in the context of treating or preventing a particular condition (for example, cyclosporin A or a derivative thereof).

According to a fifth aspect of the invention there is provided a method of providing a cosmetic benefit to a subject comprising administering to said subject a composition prepared according to the first aspect of the invention or a composition according to the second aspect of the invention.

According to preferred embodiments, the compositions include one or more ACIs, for example one or more of the ACIs listed herein, for example a hydrophobic ACI; the ACI may be an anti-aging agent, such as an anti-aging lipo-peptide or a derivative thereof.

A method according to the fifth aspect of the invention may optionally provide a cosmetic benefit selected from skin hydration, skin softening, a reduction in the appearance of skin aging, a reduction in the appearance of age related skin spots, a reduction in unevenness of skin tone, skin whitening, a reduction in the prominence or scars, a reduction of skin redness, a reduction in the appearance of skin surface capillaries. Such a method preferably involves the administration of a topical composition to the skin (for example, a composition comprising an anti-aging agent, such as a composition comprising an anti-aging lipo-peptide or a derivative thereof).

Methods of the fifth aspect of the invention also include methods that provide a cosmetic benefit to the hair, nails and eye lashes. Such methods may optionally involve the administration to the subject of a composition which is, respectively, a shampoo or hair conditioner or tonic; a nail varnish or cream; or a mascara.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

Preparation of Silicon Nanoparticles

The silicon nanoparticles relating to the invention may conveniently be prepared by techniques conventional in the art, for example by milling processes or by other known techniques for particle size reduction. The silicon-containing nanoparticles made from sodium silicate particles, colloidal silica or silicon wafer materials. Macro or micro scale particles are ground in a ball mill, a planetary ball mill, plasma or laser ablation methods or other size reducing mechanism. The resulting particles may be air classified to recover nanoparticles. It is also possible to use plasma methods and laser ablation for nanoparticles production.

Porous particles may be prepared by methods conventional in the art, including the methods described herein.

Preparation of Creams and Gels

Creams and gels may be formulated simply by dispersing (i.e. mixing) the silicone nanoparticles of the invention with a cream or gel base. For example, the silicon nanoparticles may be stirred into a pharmaceutical cream base. In respect of a gel, the powder may be stirred into the gel matrix in powder form and then the gel hydrated, or it may be stirred into a pre-hydrated gel.

Preparation of Patches

A patch may be formulated by any appropriate method, for example, a patch containing a muco-adhesive hydrophilic gel may be produced, the gel may be produced with silicon nanoparticles of the invention, dispersed in it and the gel may optionally be dried by gentle evaporation of water to become a film with the required adhesive properties.

Example Silicon Nanoparticles Preparation

Weight and ratio of materials used in an exemplary protocol:

| Samples | Caffeine | SiNPs | PC | Glycine | Ratio Drug:SiNPs formula |
|---|---|---|---|---|---|
| PC1 | 1 mg | 2 mg | 1 mg | 200 μg | 1:2 |
| PC2 | 1 mg | 2 mg | 2 mg | 200 μg | 1:2 |
| PC4 | 1 mg | 2 mg | 4 mg | 200 μg | 1:2 |
| CTR | 1 mg | / | / | / | 1:2 |

Methods:

Part 1. Loading of Silicon Nanoparticles

A. Preparation of Caffeine Stock Solution
  1. Weigh 10 mg of caffeine and dissolve the content in 10 ml of distilled water into the test tube, sonicate it if necessary.
  2. The clear solution is caffeine at 1 mg/mL.

B. Preparation of Hydrogenated Phosphatidylcholine Stock Solution (PC)
  1. Dissolve 10 mg of PC in 10 mL of Ethanol. The final concentration is phosphatidylcholine at 1 mg/mL.

C. Preparation of Stock Solution of Glycine (Gly200)
  1. Dissolve 10 mg of arginine in 10 mL of distilled water, sonicate it if necessary. The final concentration is arginine at 1 mg/mL.

D. Stock Suspension of Silicon Nanoparticles
  1. Transfer 8 mL of the Si-NPs stock solution in a test tube. Concentration of Si-NPs filtered particles is equal to 1 mg/mL.

E. Buffer pH 7.4
  1. Transfer 1 tablet of phosphate buffered saline (Sigma Aldrich) into a beaker and dissolve it into 200 mL distilled water. Final solution is PBS at pH 7.4

Part Two: Sample Preparation and Analysis

A—Loading of nanoparticles with Caffeine—preparation of sample PC1 (Caffeine+Si–NPs+PC4+Gly100)
  1—Transfer 1 mL PC solution (B) in the small round bottle flask.
  2—Evaporate the solvent using a rotary evaporation system to form a PC film.
  3—In a separate test tube, mix 1 ml of caffeine solution (A) to 2 ml of filtrated Si-NPs (D) and 200 μL of Glycine solution (C), then stir the solution gently.
  4—Rehydrate the PC film using the above mixture of SiNPs-caffeine solution
  5—Wash the flask wall using 0.5 ml of distilled water.
  6—Mix the components for a couple of minutes using vortex.
  7—Keep in the fridge for 2 hrs and then move to freezer for 2-3 hours.
  8—Connect the test tube to the freeze drier system for overnight drying.
  9—The dried powder is silicon nanoparticles loaded with caffeine in ratio 2:1.

Further Examples

Franz Cell Studies

Figure 1:
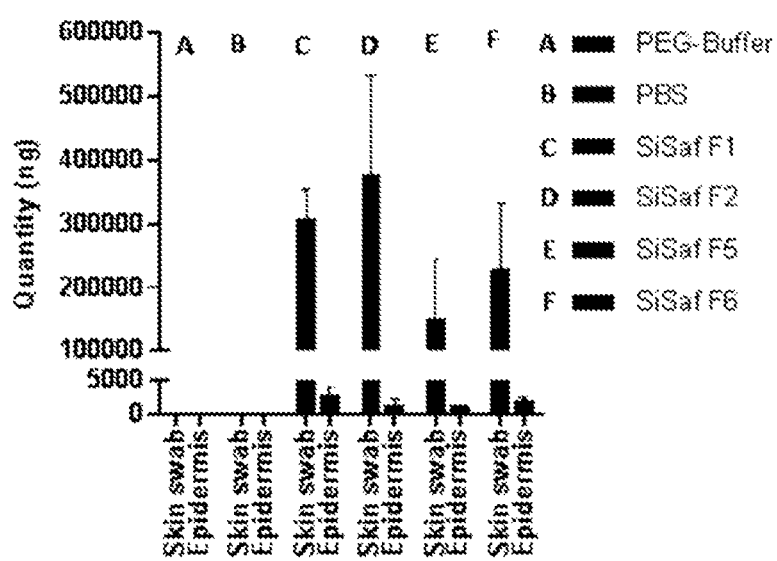
FIG. 1 shows graphs of composition comprising oils and the rate of skin penetration using Franz cell experiments.
Figure 2:
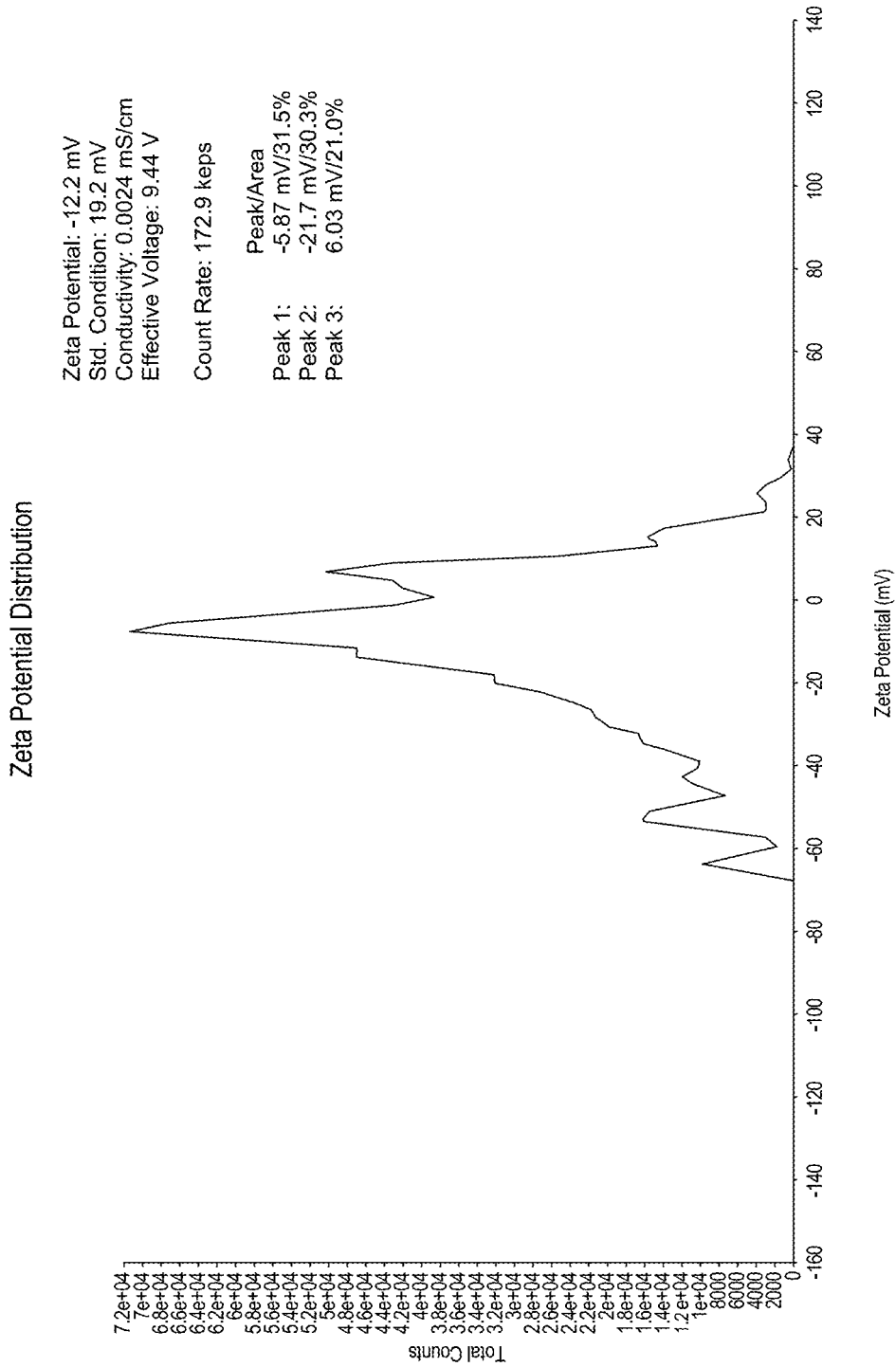
FIGS. 2 to 10 show the zeta potential distribution for various samples in accordance with the table below.
Figure 3:
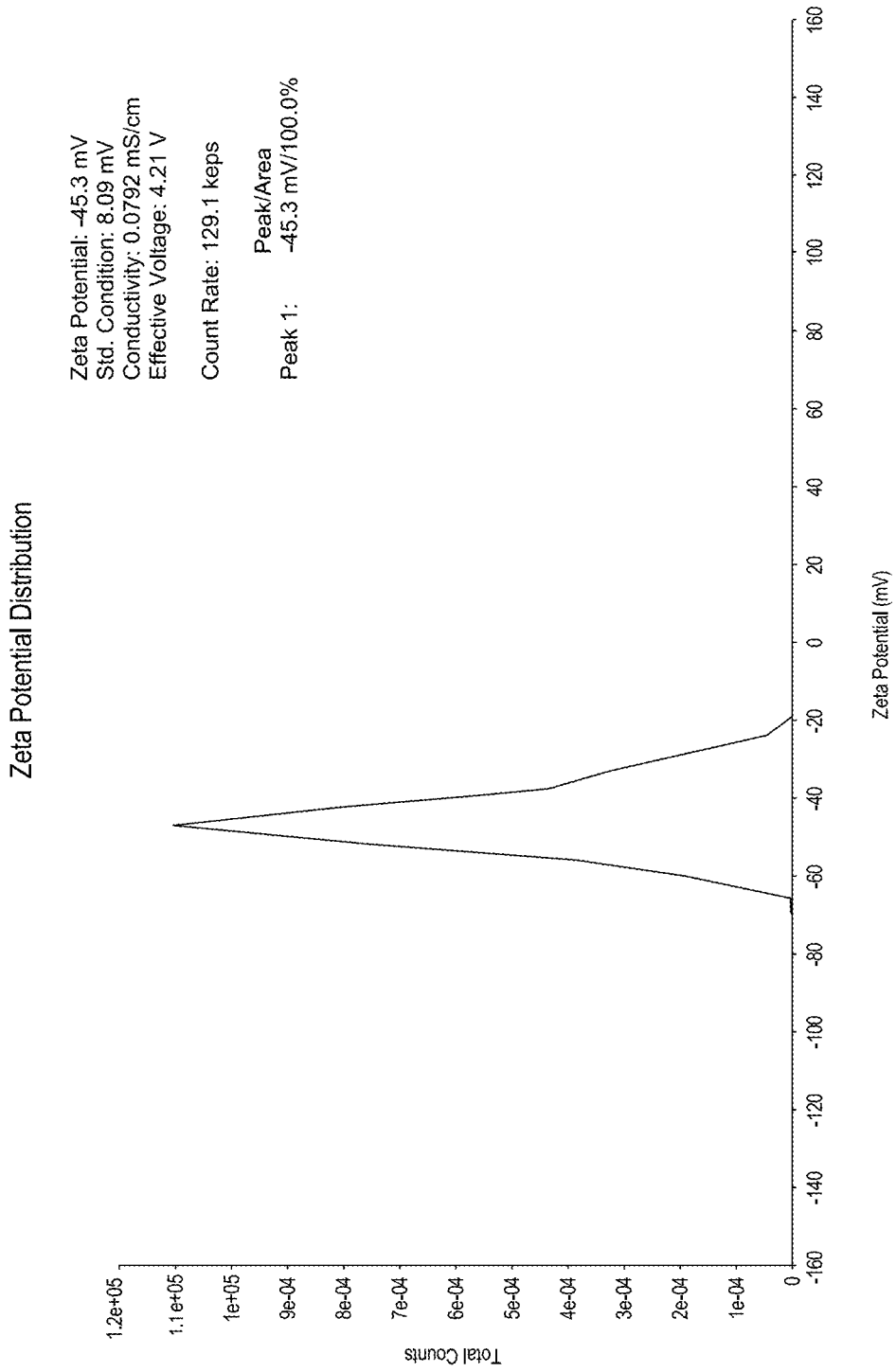
Figure 4:
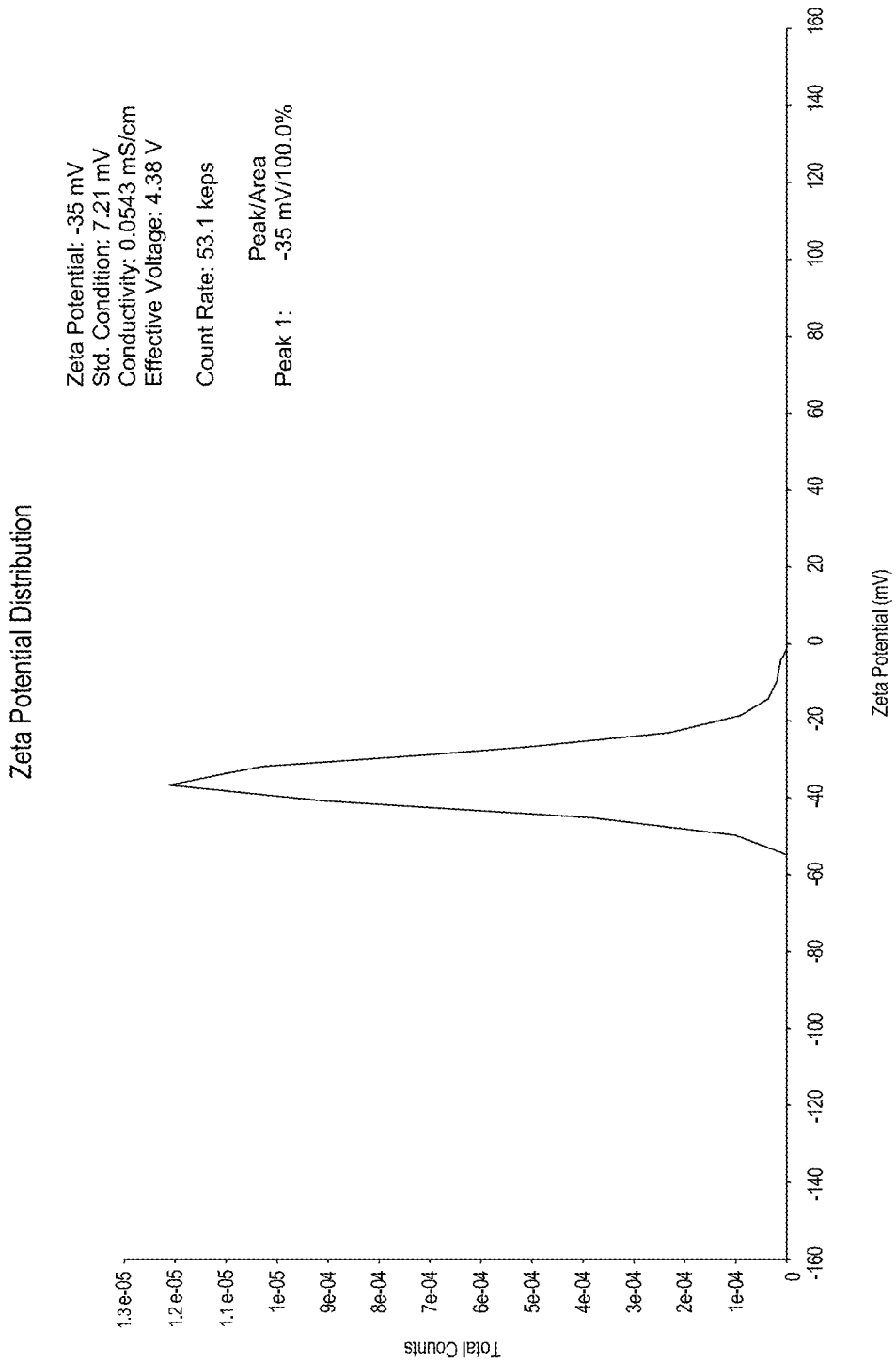
Figure 5:
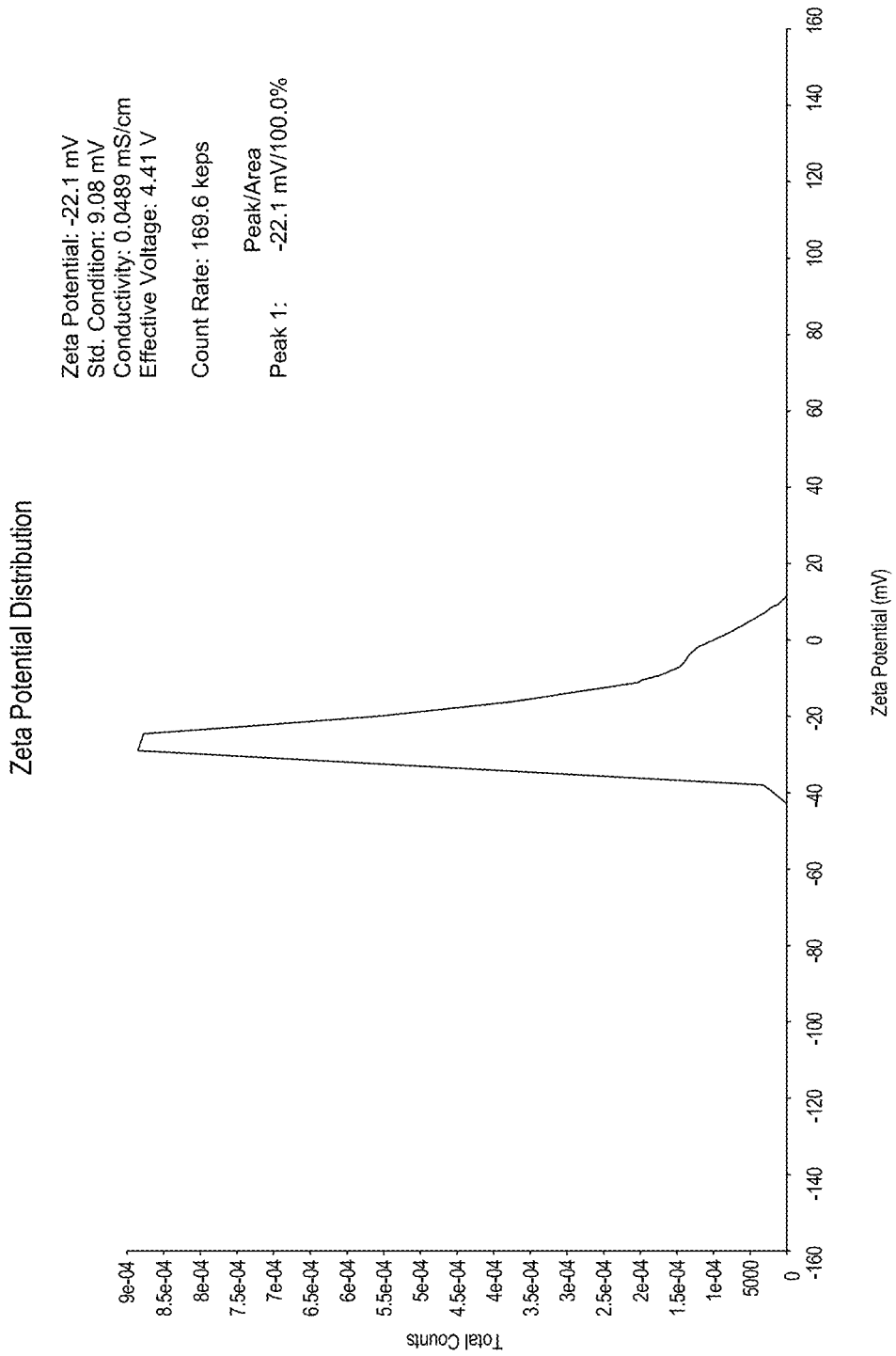
Figure 6:
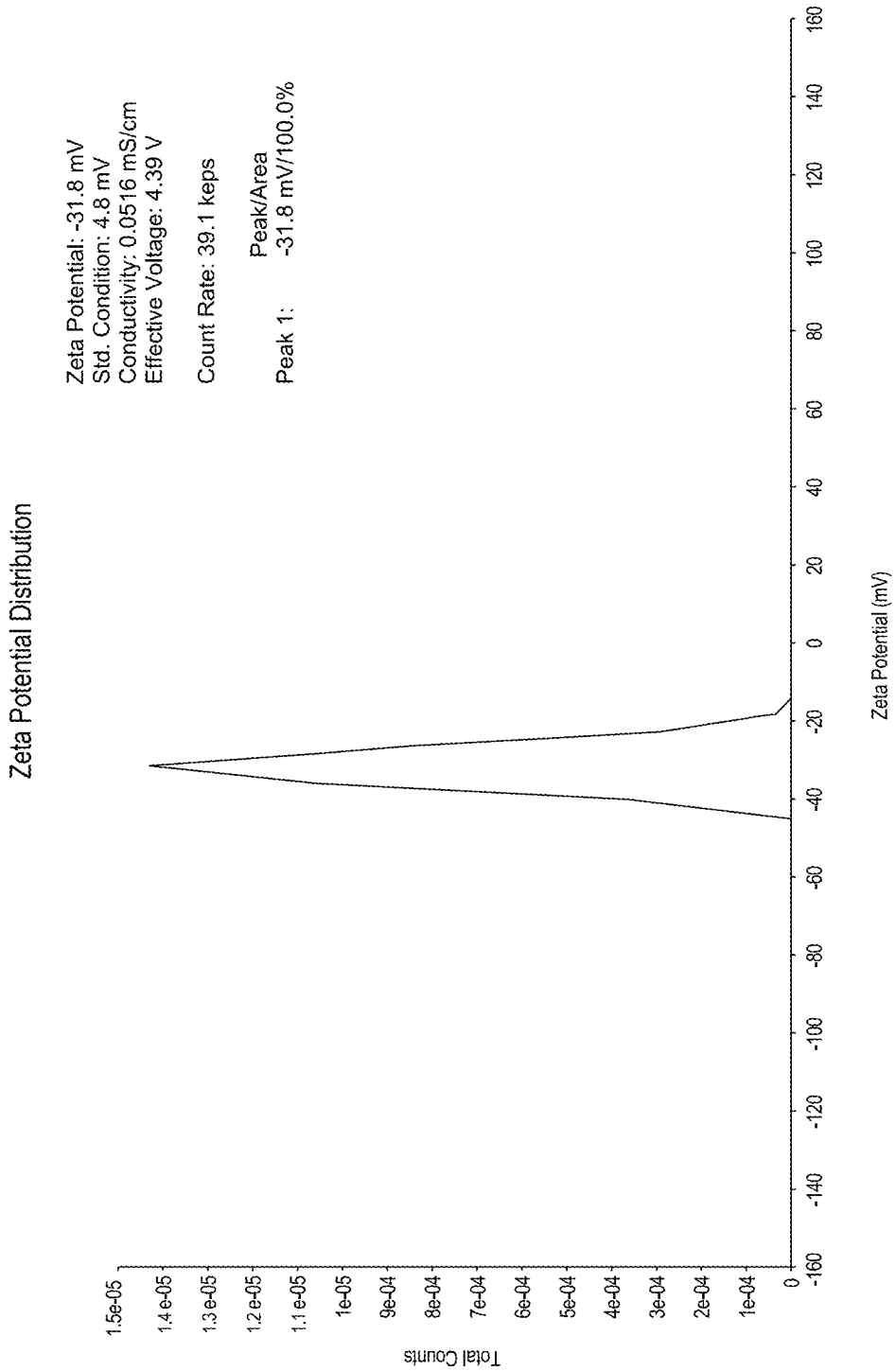
Figure 7:
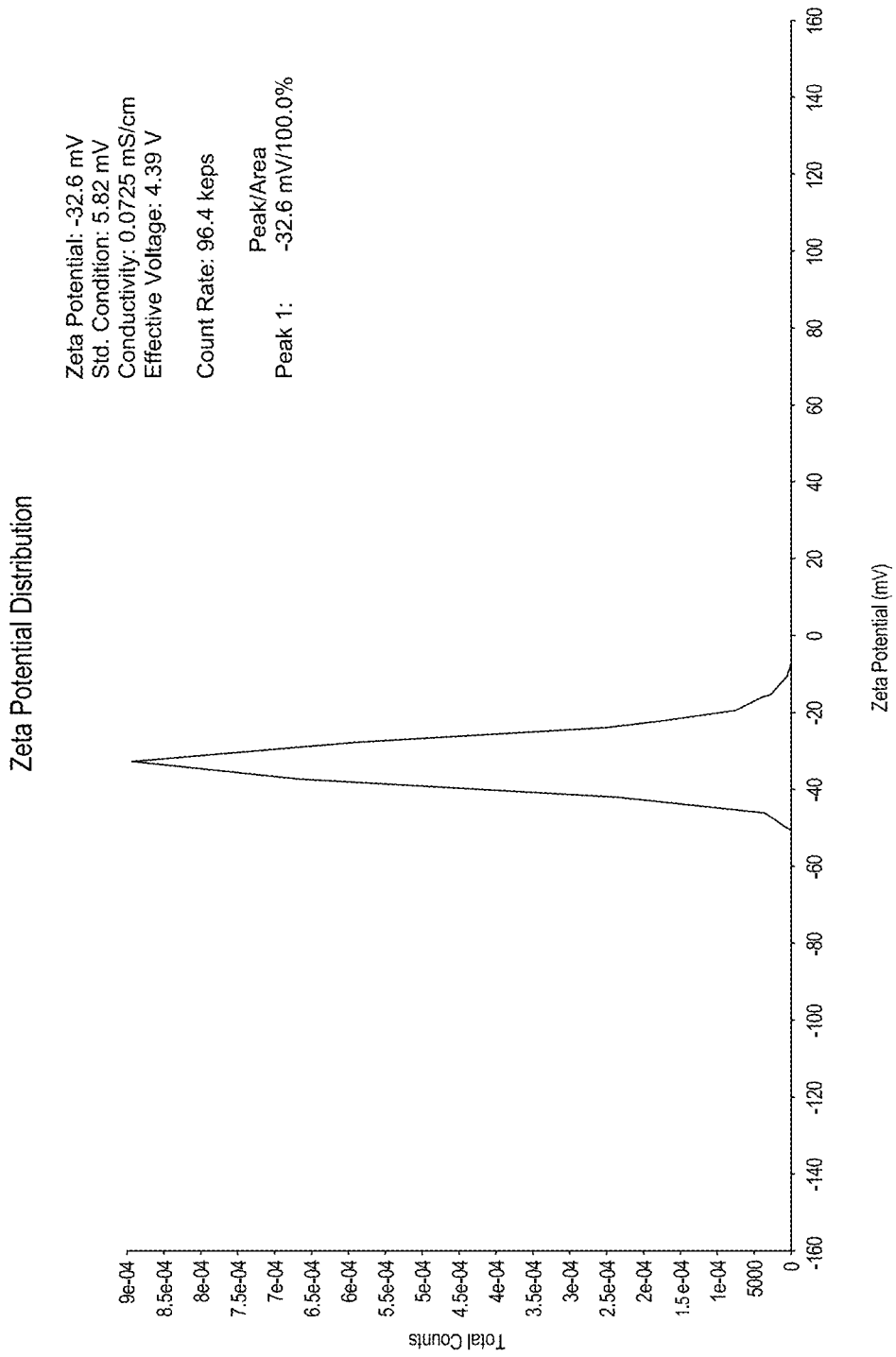
Figure 8:
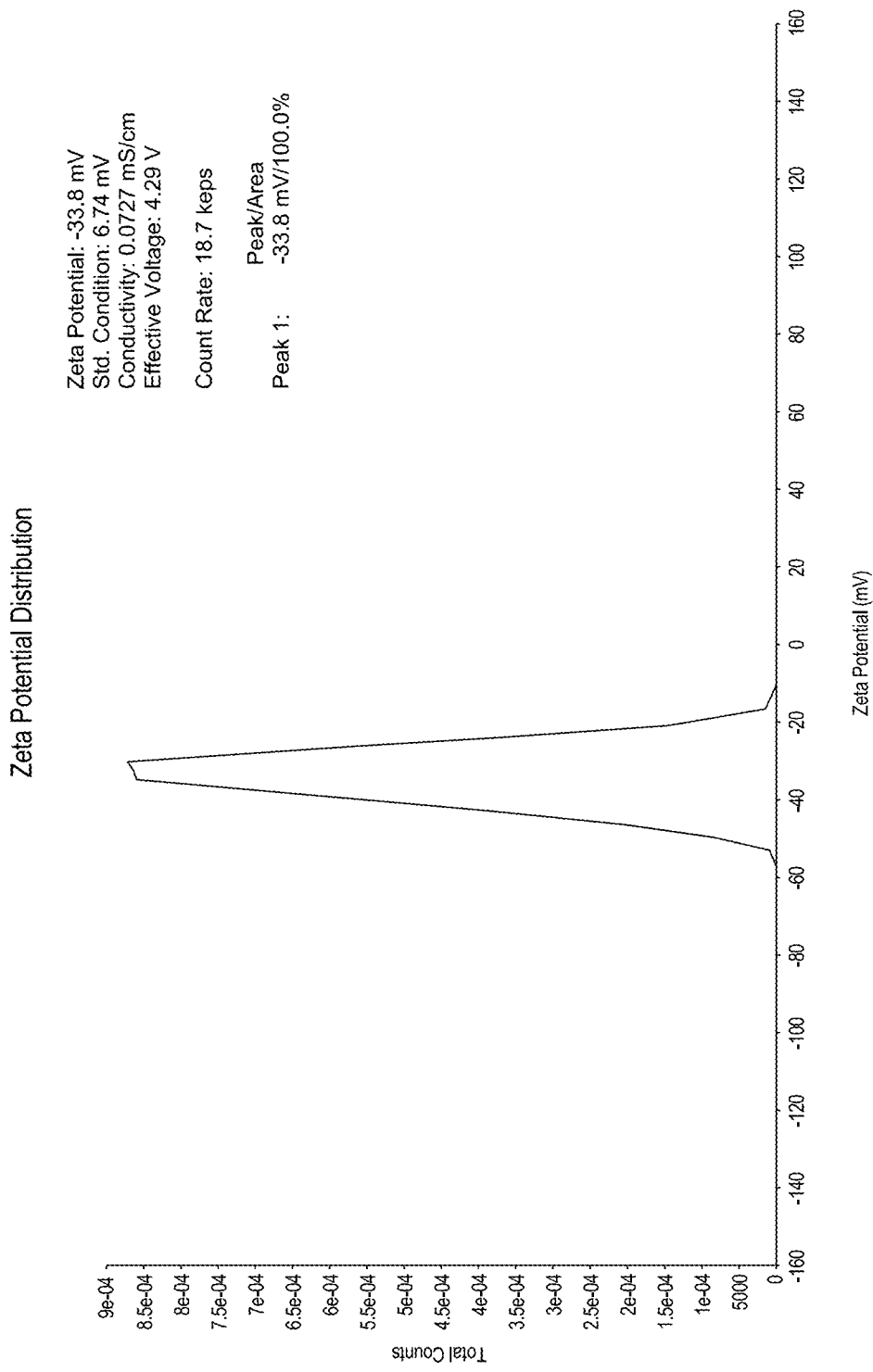
Figure 9:
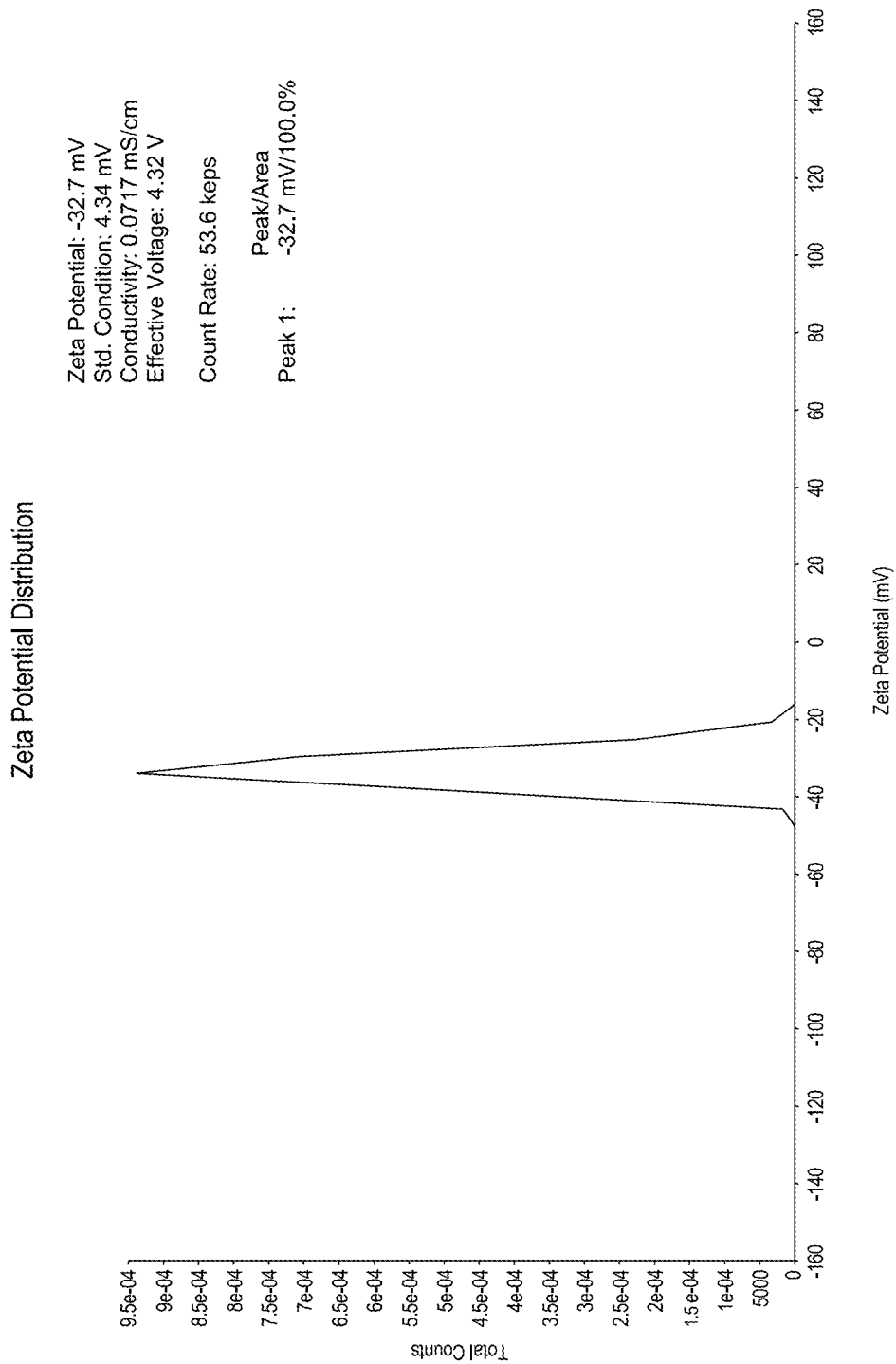
Figure 10:
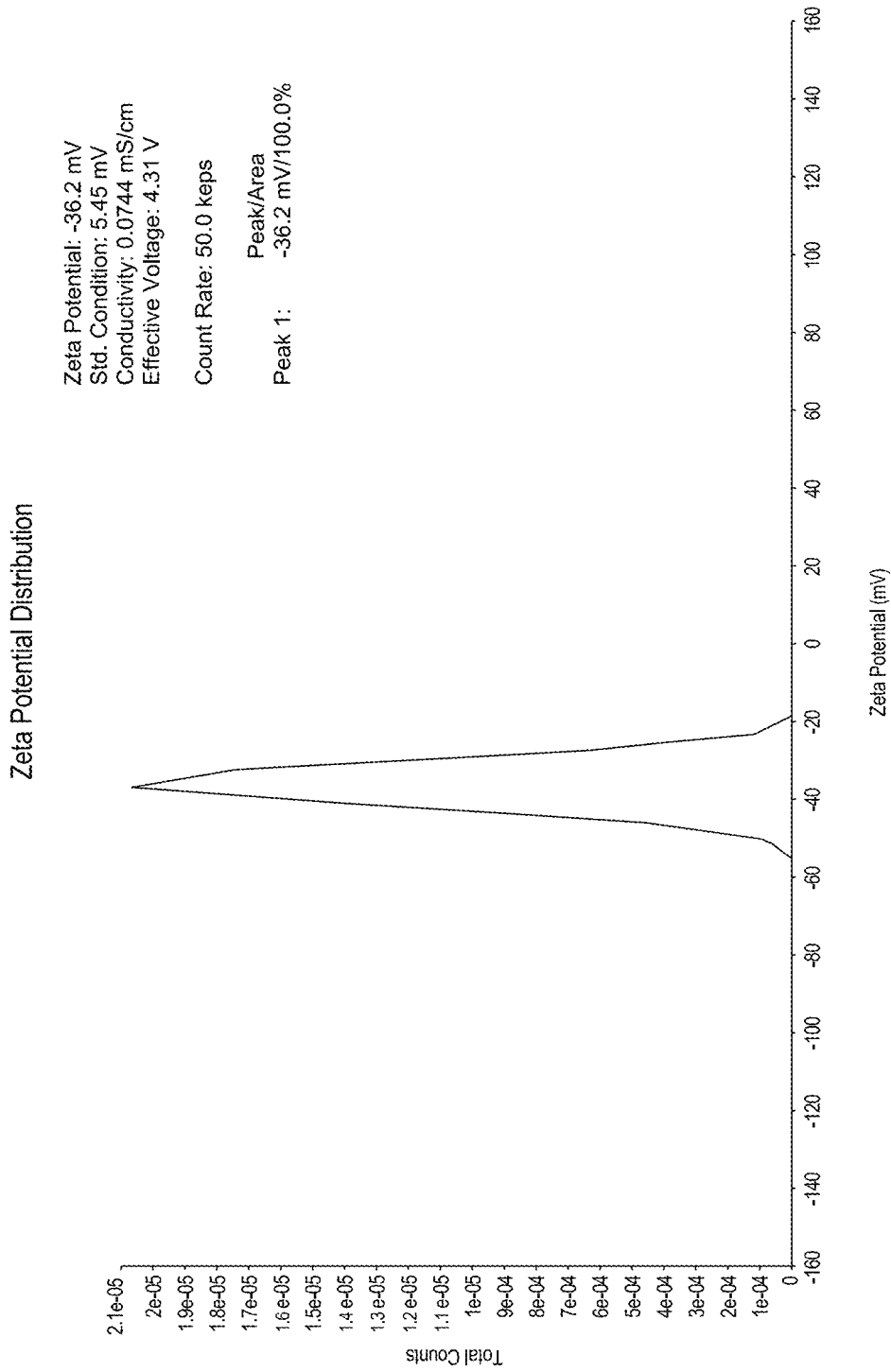

In a further example, Franz cell studies are used as an in vitro method of testing the release of an API from a semi solid formulation. When an API was formulated without silicon nanoparticles of the invention, more than 99% of the sample was lost and was undetected in the Franz cell studies. When the API was formulated in accordance with the details given in the table above for formulations F1, F2, F6, F2 and F5 as shown in FIG. 1, the API, in contrast to the controls (bars A and B, not visible in figure), formulations F1, F2, F5 and F6 resulted in detection of the API in both treated tissue and the acceptor compartment of a Franz cell.

Cyclosporin A-loaded silicon nanoparticles formulated with phosphatidylcholine

In a yet further example, the API Cyclosporin A (CyA) was formulated with silicon nanoparticles of the invention (SiNPs) and the lipid phosphatidylcholine (PC). Different ratios of lipid to silicon and of lipid to API were used, as shown in Table 3 below.

The average particle size and zeta potential were recorded for CyA, PC3-Si and PC3-CyA-Si using a Malvern zeta sizer (Malvern Instrument Ltd., Malvern, UK). All the batches were vortexed to obtain a homogeneous suspension in deionized water (1 mg/ml) and then diluted with water at 1:10 dilution for analysis. FT-IR analyses were carried out on: CyA; SiNPs (30 nm); SiNPs before loading with CyA; and CyA-loaded SiNPs.

Zeta potential analysis (see Table 2) showed that CyA-loaded SiNPs had a zeta potential of −17.8 mV. The corresponding unloaded SiNPs were shown to have a surface charge of −22.2 mV. As the zeta potential for CyA alone, unloaded SiNPs and CyA-loaded SiNPs are similar, this finding suggests CyA has been successfully embedded within the SiNPs, and thus does not contribute to the surface charge. Moreover, the zeta potential of each of the lipid formulations is higher than −30 mV, indicating that these lipid formulations are stable under aqueous conditions.

Dynamic light scattering measurements revealed a significant increase in diameter from the empty SiNPs (377.9 nm) to the CyA-loaded SiNPs (1334 nm). This increase in diameter indicates successful loading of the SiNPs with CyA.

TABLE 2

| Sample | Size (nm) | Zeta Potential (mV) |
|---|---|---|
| CyA | — | −31.2 |
| SiNPs | — | −22.5 |
| Empty PC3-Si (no CyA) | 377.9 | −22.2 |

TABLE 2-continued

| Sample | Size (nm) | Zeta Potential (mV) |
|---|---|---|
| PC3-CyA-Si (loaded with CyA) | 1334 | −17.8 |

CyA is a lipophilic peptide, meaning that if CyA loads onto the PC-Si nanoparticle, it is expected to do so within the lipid (PC) bilayer, with a concomitant reduction in aggregation of CyA. FT-IR analysis was used to determine the extent of any CyA β-sheet ordering, which would indicate aggregation of the CyA. FT-IR analyses of free CyA (before loading) show a peak at 1624 cm$^{-1}$ which indicates β-sheet ordering. An increase in signal is observed with increasing concentration of free CyA, which suggests CyA aggregation is concentration-dependent. FT-IR spectra for CyA-loaded PC (without SiNPs) shows decreasing β-sheet ordering with increasing PC content, which suggests that CyA loading within the PC bilayer increases as PC content increases. A similar pattern is also observed for CyA-loaded SiNPs formulated with PC, indicating that CyA is loaded within the PC lipid bilayer of the loaded nanoparticle.

In order to test the recovery of CyA from the silicon nanoparticles, a method was developed for digestion of the formulations in Table 2, using methanol and sonication over a period of 1 hour. Each freeze-dried formulation was suspended in methanol so as to provide a theoretical CyA concentration of 0.05 mg/ml. Sonication was carried out for 30 minutes, prior to analysis by HPLC. The results are shown in Table 3.

TABLE 3

| Sample name | PC | CyA | SiNPs (30 nm) | Lipid:Drug | Lipid:SiNPs | Normalised recovery (%) (n = 3) |
|---|---|---|---|---|---|---|
| PC1-Cya | 10 mg | 20 mg | — | 1:2 | — | 99.29 |
| PC2-Cya | 20 mg | 20 mg | — | 1:1 | — | 98.13 |
| PC3-Cya | 40 mg | 20 mg | — | 2:1 | — | 92.32 |
| PC4-Cya | 80 mg | 20 mg | — | 4:1 | — | 89.83 |
| PC1-Cya-Si | 10 mg | 20 mg | 5 mg | 1:2 | 2:1 | 107.93 |
| PC2-Cya-Si | 20 mg | 20 mg | 5 mg | 1:1 | 4:1 | 100.75 |
| PC3-Cya-Si | 40 mg | 20 mg | 5 mg | 2:1 | 8:1 | 95.61 |
| PC4-Cya-Si | 80 mg | 20 mg | 5 mg | 4:1 | 16:1 | 87.32 |

As Table 3 shows, recovery of the API reaches a plateau and then decreases at high enough mass ratios of lipid to silicon nanoparticles. Thus, the present inventors have found that the recovery of the API is dependent upon the lipid to silicon nanoparticle ratio. However, API recovery does not simply increase as this ratio increases. Rather, there is an optimum range of lipid to silicon nanoparticle ratios (and a corresponding optimum range of lipid to API ratios) for delivery of the API. The particles were further found to have a clinically safe orthosilicic acid (OSA) release profile.

Cyclosporin (CyA) is considered the gold standard to treat moderate-to-severe psoriasis and atopic dermatitis. It would be preferable to administer CyA topically to treat these conditions. However, many physicochemical problems are associated with CyA. The drug has a high molecular weight (1202 Da), high hydrophobicity (Log P ca.3), poor water solubility (2 to 6 µg/ml) and structural vulnerability. Topical delivery of CyA is restricted because of the inability of the molecules to cross the stratum corneum, leading to inadequate penetration of CyA into the skin.

The novel delivery system of the present invention, which has now been shown to take up and release CyA in a controlled and sustained manner, can facilitate the topical delivery of CyA. Liposomal delivery systems such as that of the present invention are considered to be promising carriers for topical drug delivery, since they can penetrate the skin through skin pores. Topical delivery of CyA using the delivery system of the invention should lead to drug deposition within the stratum corneum, enabling delivery of the drug to psoriasis lesion sites. Moreover, ortho silicic acid released by the SiNPs themselves should aid in the recovery of dermal fibroblasts which have been compromised by psoriatic inflammation.

Lipo-Peptide-Loaded Silicon Nanoparticles Formulated with Phosphatidylcholine

In a further example, a 5-mer peptide lipidated at the N-terminus was selected as an API and was formulated with silicon nanoparticles of the invention (SiNPs) and the lipid phosphatidylcholine (PC). This API is a lipo-peptide comprising a hydrophilic head group (comprising the peptide) and a hydrophobic tail group (comprising the lipidic chain).

Different ratios of lipid to silicon (and of lipid to API) were used, as shown in Table 5.

Dynamic light scattering was performed to determine the overall size of the nanoparticles, with and without the API. A change in nanoparticle size can indicate whether the API has been loaded or not. Likewise, a change in surface charge or zeta potential (ZP) can indicate whether the API has been loaded. A Malvern zeta sizer (Malvern Instrument Ltd., Malvern, UK) was used to perform these measurements. The results are shown in Table 4.

A negative zeta potential was observed for empty PC-Si (nanoparticles without the API). In contrast, a positive zeta potential was reported for PC-API-Si (nanoparticles loaded with the API). This increase in surface charge with the API indicates that the API has been incorporated into the PC bilayer. It appears that the lipid chain of the the API (which is a lipo-peptide) has been incorporated in the PC lipid bilayer, while the peptide head group decorates the surface of the nanoparticle. This head group, comprising two lysine residues, is positively charged, leading to a positive zeta potential value for the API-loaded nanoparticles. Moreover, the concomitant increase in nanoparticle size indicates successful loading of the nanoparticles with the API.

TABLE 4

| Sample | Size (nm) | Zeta Potential (mV) |
|---|---|---|
| Empty PC-Si (no API) | 1954 | −4.49 |
| PC-API-Si (loaded with API) | 2574 | 10.9 |

The protocol used to test recovery of the API corresponds to that used to test the recovery of CyA above. The results of the API recovery are shown in Table 5.

TABLE 5

| Sample | API | SiNPs | PC | Lipid:Drug | Lipid:SiNPs | Normalised Recovery (%) |
|---|---|---|---|---|---|---|
| PC1-API-Si | 20 mg | 5 mg | 20 mg | 1:1 | 4:1 | 97.83% |

TABLE 5-continued

| Sample | API | SiNPs | PC | Lipid:Drug | Lipid:SiNPs | Normalised Recovery (%) |
|---|---|---|---|---|---|---|
| PC2-API-Si | 20 mg | 5 mg | 40 mg | 2:1 | 8:1 | 101.25% |
| PC3-API-Si | 20 mg | 5 mg | 80 mg | 4:1 | 16:1 | 95.83% |

As Table 5 shows, recovery of the API reaches a plateau and then decreases at high enough mass ratios of lipid to silicon nanoparticles. Thus, there is an optimum range of lipid to silicon nanoparticle ratios for delivery of the API.

Lipo-peptides are typically used to promote collagen production in anti-wrinkle formulations. However, topical application of lipo-peptides has been found to be problematic, due to poor delivery of the API across the stratum corneum. In order to improve penetration of the API into the skin, the lipo-peptide may be delivered using the nanoparticles of the present invention, which penetrate the skin via skin pores.

The invention claimed is:

1. A method for promoting controlled binding and release of a bioactive or pharmaceutical agent from a composition, wherein the composition comprises silicon nanoparticles and the silicon nanoparticles comprise at least 50% by weight silicon, said method comprising:
(a) treating the surface of the silicon nanoparticles with one or more phospholipids, one or more, charged lipids, or a combination of one or more phospholipids and one or more charged lipids, wherein the ratio of lipid to silicon is from 1:1 to 15:1; and
(b) treating the surface of the silicon nanoparticles with at least one amino acid selected from the group consisting of: arginine, glycine, and a combination of arginine and glycine.

2. The method according to claim 1, wherein the ratio of lipid to silicon is from 1:1 to 8:3.

3. The method according to claim 1, wherein the ratio of amino acid to silicon is from 0.05:1 to 2:1, and/or wherein the ratio of the lipid to the bioactive or pharmaceutical agent is from 1:1 to 15:1.

4. The method according to claim 1, wherein the silicon nanoparticles have an average diameter of between 20-100 nm, and/or wherein the silicon nanoparticles are porous.

5. The method according to claim 1, wherein the lipid is phosphatidylcholine and the amino acid is arginine.

6. The method according to claim 1, wherein the method comprises loading the treated silicon nanoparticles with a pharmaceutical or bioactive agent.

7. The method according to claim 6, wherein: the pharmaceutical or bioactive agent is cyclosporin A or an anti-aging lipo-peptide; or wherein the pharmaceutical or bioactive agent is an anionic molecule, such as a nucleic acid; or wherein the pharmaceutical or bioactive agent is a peptide or polypeptide associated with the silicon nanoparticles, and the ratio of lipid to API associated with silicon nanoparticles is from 15:1 to 1:1.

8. The method according to claim 1, wherein the method comprises treating the surface of the silicon nanoparticle with an oil.

9. The method according to claim 1, wherein the at least one lipid is selected from selected from the group consisting of phosphatidylcholine, hydrogenated phosphatidylcholine, didecanoyl phosphatidylcholine, mirystoil phosphatidylcholine, lecithin, phosphatidylethanolamine, stearylamine, dioleoylphosphatidylethanolamine or combinations thereof, and/or wherein the at least one amino acid is selected from aspartic acid, glutamic acid, tyrosine, glycine, alanine, valine, leucine, isoleucine, proline, phenylalanine, methionine, tryptophan, histidine, threonine, asparagine, arginine and glutamine.

10. A composition comprising: a) silicon nanoparticles that comprise at least 2% by weight silicon; b) one or more lipids, selected from the group consisting of: phospholipids, one or more charged lipids, or a combination of one or more phospholipids and one or more charged lipids; and c) at least one amino acid selected from the group consisting of: arginine, glycine, or a combination of arginine and glycine; wherein the ratio of lipid to silicon is from 1:1 to 15:1; and wherein the composition is for the controlled release of pharmaceutical or bioactive agents.

11. The composition according to claim 10, wherein the ratio of amino acid to silicon is from 0.1:1 to 2:1, and/or wherein the lipid is phosphatidylcholine and the amino acid is arginine, and/or wherein the silicon nanoparticles have an average diameter of between 20-100 nm, and/or wherein the silicon nanoparticles are porous.

12. The composition according to claim 10, wherein the treated silicon nanoparticles are loaded with a pharmaceutical or bioactive agent.

13. The composition according to claim 10, further comprising an oil.

14. The composition according to claim 10, wherein the at least one lipid is selected from selected from the group consisting of phosphatidylcholine, hydrogenated phosphatidylcholine, didecanoyl phosphatidylcholine, mirystoil phosphatidylcholine, lecithin, phosphatidylethanolamine, stearylamine, dioleoylphosphatidylethanolamine or combinations thereof, and/or wherein the at least one amino acid is selected from aspartic acid, glutamic acid, tyrosine, glycine, alanine, valine, leucine, isoleucine, proline, phenylalanine, methionine, tryptophan, histidine, threonine, asparagine, arginine and glutamine.

15. The composition according to claim 10, wherein the ratio of the lipid to the pharmaceutical or bioactive agent is from 1:1 to 15:1.

16. The composition according to claim 10, wherein the composition comprises one or more phospholipids.

17. The composition according to claim 10, wherein the composition comprises one or more charged lipids.

18. The composition according to claim 10, wherein the comprises one or more phospholipids and one or more charged lipids.

19. The composition according to claim 17, wherein the ratio of lipid to silicon is from 1:1 to 8:3.

20. The composition according to claim 11, wherein the ratio of amino acid to silicon is from 0.25:1 to 0.7:1.

21. The composition according to claim 10, wherein the ratio of the lipid to the pharmaceutical or bioactive agent is from 1:1 to 3:1.

22. The composition of claim 10, wherein the amino acid is arginine.

23. The method of claim 1, wherein the surface of the silicon nanoparticles is treated with arginine.

* * * * *